(12) United States Patent
Mongrain et al.

(10) Patent No.: US 10,683,435 B2
(45) Date of Patent: *Jun. 16, 2020

(54) WET COATING COMPOSITIONS FOR PAPER SUBSTRATES, PAPER SUBSTRATES COATED WITH THE SAME AND PROCESS FOR COATING A PAPER SUBSTRATE WITH THE SAME

(71) Applicant: CASCADES SONOCO INC., Kingsey Falls (CA)

(72) Inventors: Yvon Mongrain, Lavaltrie (CA); Guillaume Turgeon, Sainte-Genevieve-de-Berthier (CA)

(73) Assignee: Cascades Sonoco Inc., Kingsey Falls, Quebec (CA)

( * ) Notice: Subject to any disclaimer, the term of this patent is extended or adjusted under 35 U.S.C. 154(b) by 122 days.

This patent is subject to a terminal disclaimer.

(21) Appl. No.: 15/809,600

(22) Filed: Nov. 10, 2017

(65) Prior Publication Data

US 2018/0072915 A1 Mar. 15, 2018

Related U.S. Application Data

(63) Continuation of application No. 15/311,662, filed as application No. PCT/CA2014/051098 on Nov. 18, 2014, now Pat. No. 9,840,642.

(51) Int. Cl.
  *C09D 191/06* (2006.01)
  *D21H 19/18* (2006.01)
  (Continued)

(52) U.S. Cl.
  CPC .............. *C09D 191/06* (2013.01); *C09D 5/00* (2013.01); *C09D 133/08* (2013.01); *D21H 19/18* (2013.01);
  (Continued)

(58) Field of Classification Search
  None
  See application file for complete search history.

(56) References Cited

U.S. PATENT DOCUMENTS

| 3,428,591 A | 2/1969 | Lewis | |
|---|---|---|---|
| 4,040,851 A * | 8/1977 | Ziegler | .................. C04B 28/04 |
| | | | 428/532 |

(Continued)

FOREIGN PATENT DOCUMENTS

| CA | 2338221 A1 | 2/2000 |
|---|---|---|
| GB | 1212530 A | 11/1970 |

(Continued)

OTHER PUBLICATIONS

International Search Report for PCT/CA2014/051098 dated Jul. 21, 2015.

(Continued)

*Primary Examiner* — Vivian Chen
(74) *Attorney, Agent, or Firm* — Eversheds Sutherland (US) LLP

(57) ABSTRACT

A wet coating composition useful for coating a cellulosic fiber-based substrate is provided. The composition includes two aqueous emulsions. The first emulsion includes an oxidized paraffin/polyethylene wax and the second emulsion includes an ethylene/acrylic acid copolymer wax, ethylene/acrylic amide copolymer wax, ethylene/acrylic acid/acrylic amide copolymer wax or a mixture thereof. The oxidized paraffin/polyethylene wax has a surface energy less than or equal to 25 mN/m being substantially dispersive energy. The wet coating composition when dried forms a coating having a surface energy ranging from 20 to 60 mN/m being the sum of dispersive and polar energies. A process for treating a cellulosic fiber-based substrate with the wet coating composition, a substrate coated and articles including the coated substrate are also described. The process involves a heating (Continued)

step to allow migration of the coating towards a core of the cellulosic fiber-based substrate.

20 Claims, 15 Drawing Sheets

(51) Int. Cl.

| | |
|---|---|
| D21H 19/20 | (2006.01) |
| D21H 19/22 | (2006.01) |
| D21H 21/16 | (2006.01) |
| C09D 133/08 | (2006.01) |
| C09D 5/00 | (2006.01) |
| D21H 23/22 | (2006.01) |
| B32B 5/14 | (2006.01) |
| B32B 21/04 | (2006.01) |
| B32B 29/08 | (2006.01) |
| B32B 3/10 | (2006.01) |
| B32B 3/28 | (2006.01) |
| B32B 21/02 | (2006.01) |
| B32B 3/02 | (2006.01) |
| B32B 29/00 | (2006.01) |
| B32B 21/06 | (2006.01) |
| B32B 5/02 | (2006.01) |
| B32B 29/06 | (2006.01) |
| B32B 38/00 | (2006.01) |
| B05D 3/00 | (2006.01) |
| B05D 3/10 | (2006.01) |
| C09D 133/04 | (2006.01) |
| C09D 133/02 | (2006.01) |
| C09D 133/26 | (2006.01) |
| B05D 3/12 | (2006.01) |
| B05D 3/02 | (2006.01) |
| C09D 191/00 | (2006.01) |
| D21H 25/00 | (2006.01) |
| D21H 19/00 | (2006.01) |
| D21H 19/12 | (2006.01) |
| D21J 1/08 | (2006.01) |
| C08L 23/08 | (2006.01) |
| B32B 27/18 | (2006.01) |
| B32B 27/10 | (2006.01) |
| C09D 7/40 | (2018.01) |
| C09D 123/30 | (2006.01) |
| C09D 5/02 | (2006.01) |
| C09D 123/08 | (2006.01) |
| C09D 123/06 | (2006.01) |
| C09D 7/20 | (2018.01) |
| C09D 7/65 | (2018.01) |
| C08L 91/06 | (2006.01) |
| C08L 33/02 | (2006.01) |
| C08L 23/30 | (2006.01) |
| C08L 23/06 | (2006.01) |
| D21H 19/44 | (2006.01) |
| D21H 19/46 | (2006.01) |
| D21H 19/58 | (2006.01) |
| D21H 19/10 | (2006.01) |
| D21H 19/72 | (2006.01) |
| D21H 19/84 | (2006.01) |
| D21H 19/56 | (2006.01) |
| D21H 19/76 | (2006.01) |
| C08K 5/098 | (2006.01) |
| C08K 5/10 | (2006.01) |
| C08K 5/053 | (2006.01) |

(52) U.S. Cl.
CPC ............ *D21H 19/20* (2013.01); *D21H 19/22* (2013.01); *D21H 21/16* (2013.01); *D21H 23/22* (2013.01); *B05D 3/00* (2013.01); *B05D 3/007* (2013.01); *B05D 3/02* (2013.01); *B05D 3/10* (2013.01); *B05D 3/12* (2013.01); *B05D 2203/20* (2013.01); *B05D 2203/22* (2013.01); *B05D 2401/20* (2013.01); *B05D 2501/10* (2013.01); *B32B 3/02* (2013.01); *B32B 3/10* (2013.01); *B32B 3/28* (2013.01); *B32B 5/02* (2013.01); *B32B 5/14* (2013.01); *B32B 5/145* (2013.01); *B32B 5/147* (2013.01); *B32B 21/02* (2013.01); *B32B 21/04* (2013.01); *B32B 21/042* (2013.01); *B32B 21/06* (2013.01); *B32B 27/10* (2013.01); *B32B 27/18* (2013.01); *B32B 29/00* (2013.01); *B32B 29/002* (2013.01); *B32B 29/06* (2013.01); *B32B 29/08* (2013.01); *B32B 38/0036* (2013.01); *B32B 2255/02* (2013.01); *B32B 2255/12* (2013.01); *B32B 2260/00* (2013.01); *B32B 2260/02* (2013.01); *B32B 2260/026* (2013.01); *B32B 2260/028* (2013.01); *B32B 2260/04* (2013.01); *B32B 2262/06* (2013.01); *B32B 2262/062* (2013.01); *B32B 2262/065* (2013.01); *B32B 2262/067* (2013.01); *B32B 2307/7265* (2013.01); *B32B 2307/73* (2013.01); *B32B 2391/00* (2013.01); *B32B 2439/00* (2013.01); *C08K 5/053* (2013.01); *C08K 5/098* (2013.01); *C08K 5/10* (2013.01); *C08L 23/06* (2013.01); *C08L 23/0846* (2013.01); *C08L 23/0869* (2013.01); *C08L 23/0892* (2013.01); *C08L 23/30* (2013.01); *C08L 33/02* (2013.01); *C08L 91/06* (2013.01); *C08L 2201/50* (2013.01); *C08L 2201/54* (2013.01); *C08L 2205/02* (2013.01); *C09D 5/02* (2013.01); *C09D 5/024* (2013.01); *C09D 5/027* (2013.01); *C09D 7/20* (2018.01); *C09D 7/65* (2018.01); *C09D 7/66* (2018.01); *C09D 7/67* (2018.01); *C09D 7/68* (2018.01); *C09D 123/06* (2013.01); *C09D 123/0846* (2013.01); *C09D 123/0869* (2013.01); *C09D 123/0892* (2013.01); *C09D 123/30* (2013.01); *C09D 133/02* (2013.01); *C09D 133/04* (2013.01); *C09D 133/26* (2013.01); *C09D 191/00* (2013.01); *D21H 19/00* (2013.01); *D21H 19/10* (2013.01); *D21H 19/12* (2013.01); *D21H 19/44* (2013.01); *D21H 19/46* (2013.01); *D21H 19/56* (2013.01); *D21H 19/58* (2013.01); *D21H 19/72* (2013.01); *D21H 19/76* (2013.01); *D21H 19/84* (2013.01); *D21H 25/00* (2013.01); *D21H 25/005* (2013.01); *D21J 1/08* (2013.01); *Y02P 20/582* (2015.11); *Y10T 428/24802* (2015.01); *Y10T 428/24934* (2015.01); *Y10T 428/3188* (2015.04); *Y10T 428/31801* (2015.04); *Y10T 428/31804* (2015.04); *Y10T 428/31808* (2015.04); *Y10T 428/31895* (2015.04); *Y10T 428/31902* (2015.04); *Y10T 428/31906* (2015.04)

(56) References Cited

U.S. PATENT DOCUMENTS 4,117,199 A * 9/1978 Gotoh ................. C09D 191/06
427/209
4,168,255 A 9/1979 Lewis et al.

(56) References Cited

U.S. PATENT DOCUMENTS

| | | | |
|---|---|---|---|
| 4,218,263 A | | 8/1980 | Kawabata et al. |
| 4,339,276 A | * | 7/1982 | Yokoyama ............... C08L 91/08 106/271 |
| 4,880,470 A | | 11/1989 | Hyche et al. |
| 4,967,520 A | * | 11/1990 | Post, Jr. ............... E04B 1/34336 52/79.5 |
| 5,049,186 A | | 9/1991 | Kawabata |
| 5,358,554 A | * | 10/1994 | Seymour ................... C08K 3/34 106/2 |
| 5,389,136 A | | 2/1995 | Danner |
| 5,393,566 A | | 2/1995 | Propst |
| 5,506,046 A | | 4/1996 | Anderson et al. |
| 5,539,035 A | | 7/1996 | Fuller et al. |
| 5,543,234 A | * | 8/1996 | Lynch ...................... B27N 3/00 264/112 |
| 5,626,945 A | * | 5/1997 | Berzins .................... D21C 5/02 428/174 |
| 5,677,369 A | * | 10/1997 | Walsh ..................... C08K 5/098 524/13 |
| 5,700,516 A | | 12/1997 | Sandvick et al. |
| 5,750,269 A | | 5/1998 | Park |
| 5,858,173 A | | 1/1999 | Propst, Jr. |
| 6,255,375 B1 | | 7/2001 | Michelman |
| 6,669,763 B1 | | 12/2003 | Ghodoussi |
| 6,971,211 B1 | * | 12/2005 | Zehner ................. E04F 13/0864 428/516 |
| 7,186,457 B1 | * | 3/2007 | Zehner .................... C08L 27/06 428/326 |
| 7,429,309 B2 | | 9/2008 | Propst, Jr. |
| 7,501,471 B2 | | 3/2009 | Boylan |
| 7,833,915 B2 | | 11/2010 | Propst, Jr. |
| 8,216,952 B2 | | 7/2012 | Oki et al. |
| 9,243,162 B1 | * | 1/2016 | Agrawal ................ D21H 19/40 |
| 9,840,642 B2 | * | 12/2017 | Mongrain ............... D21H 23/22 |
| 2002/0018907 A1 | * | 2/2002 | Zehner .................... B32B 23/08 428/537.1 |
| 2003/0152707 A1 | * | 8/2003 | Hassan ................... D21H 17/60 427/384 |
| 2003/0219613 A1 | | 11/2003 | Boylan |
| 2005/0215678 A1 | | 9/2005 | Ludtke et al. |
| 2006/0122313 A1 | | 6/2006 | Boylan |
| 2006/0210737 A1 | | 9/2006 | Wang et al. |
| 2007/0068642 A1 | * | 3/2007 | Borsinger ............. C09D 191/06 162/172 |
| 2008/0187669 A1 | | 8/2008 | Kingma et al. |
| 2008/0200604 A1 | | 8/2008 | Fechtenkotter et al. |
| 2009/0194450 A1 | | 8/2009 | Dabadie et al. |
| 2012/0114889 A1 | | 5/2012 | Dabadie et al. |
| 2013/0245190 A1 | | 9/2013 | Yamazaki et al. |
| 2014/0113148 A1 | | 4/2014 | Propst, Jr. |
| 2015/0353739 A1 | | 12/2015 | Webster et al. |
| 2016/0122588 A1 | * | 5/2016 | Agrawal ............... C09D 191/06 |
| 2016/0289487 A1 | * | 10/2016 | Gerlach ................ C09D 133/10 |

FOREIGN PATENT DOCUMENTS

| | | |
|---|---|---|
| JP | 06-136304 A | 5/1994 |
| WO | 2003046039 A1 | 6/2003 |
| WO | 2009097166 A1 | 8/2009 |
| WO | 2011130527 A1 | 10/2011 |
| WO | 2014113425 A1 | 7/2014 |

OTHER PUBLICATIONS

Written Opinion of the International Searching Authority for PCT/CA2014/051098 dated Jul. 21, 2015.

* cited by examiner

WET COATING COMPOSITIONS FOR PAPER SUBSTRATES, PAPER SUBSTRATES COATED WITH THE SAME AND PROCESS FOR COATING A PAPER SUBSTRATE WITH THE SAME

CROSS-REFERENCE TO RELATED APPLICATIONS

This application is a continuation of U.S. application Ser. No. 15/311,662, filed Nov. 16, 2016, which is the U.S. national stage entry of PCT/CA2014/051098, filed Nov. 18, 2014, which are incorporated herein by reference.

TECHNICAL FIELD

The technical field relates to compositions useful to make water-resistant coatings for the paper industry, to a process for coating a paper substrate with such coating compositions and to resulting coated paper-based products.

TECHNICAL BACKGROUND

Wax coatings are widely used as water-resistant barriers in paper and paperboard products. Boxes made from wax coated board are used for example for carrying food products, such as fruits and vegetables, which are transported in refrigerated spaces where moisture is present. These types of boxes are often coated both internally and externally to provide a good barrier.

However, the high coat weight of wax makes these boxes expensive. Moreover, wax coated products usually made from hot melt coatings are not recyclable or repulpable which makes them less environmental friendly.

Recyclable coatings as an alternative to wax coatings exist. However, they show some drawbacks such as for example difficulties to flute a medium which tends to delaminate during corrugation, difficulties to glue or edge wicking. In some cases, even though the inside and the outside liners of a box are treated, the vent-holes permit the water to go through the flutes thus weakling the structure of the box.

In light of the aforementioned, there is thus a need for new water-resistant coatings as an alternative to known wax coatings which are mostly repulpable and environmental friendly.

There is a need for water-resistant coatings limiting and/or avoiding edge-wicking and showing good runnability on corrugator, on fluting and also gluing.

BRIEF SUMMARY

It is therefore an aim of the present invention to address the above mentioned issues.

In one aspect, there is provided a wet coating composition comprising:
a first aqueous emulsion of an oxidized paraffin/polyethylene wax; and
a second aqueous emulsion of an ethylene/acrylic acid copolymer wax, ethylene/acrylic amide copolymer wax, ethylene/acrylic acid/acrylic amide copolymer wax or a mixture thereof;
wherein the oxidized paraffin/polyethylene wax has a surface energy less than or equal to 25 mN/m being substantially dispersive energy; and
wherein the wet coating composition when dried forms a coating having a surface energy ranging from 20 to 60 mN/m being the sum of dispersive and polar energies.

In one optional aspect, the surface energy of the oxidized paraffin/polyethylene wax ranges from about 16 to about 21 mN/m.

In another optional aspect, the surface energy of oxidized paraffin/polyethylene wax is more than about 99% dispersive energy.

In another optional aspect, the surface energy of the coating ranges from about 21 to about 34 mN/m.

In another optional aspect, the surface energy of the coating ranges from about 24 to about 25 mN/m.

In another optional aspect, the surface energy of the coating is about 1 to 3% polar energy.

In another optional aspect, the wet coating composition further comprises a dispersant.

In another optional aspect, the dispersant comprises an anionic surfactant.

In another optional aspect, the dispersant comprises a salt of a polyacrylic acid, a salt of a polyacrylamide, a salt of a carboxylic acid, a mixture of a salt of an alkyl ester and an alkyl diol, or any mixture thereof.

In another optional aspect, the dispersant comprises a sodium salt of a polyacrylic acid, a sodium salt of a polyacrylamide or a mixture of a sodium salt of an alkyl ester and 1,2-propanediol.

In another optional aspect, the dispersant comprises a mixture of a sodium salt of an alkyl ester and 1,2-propanediol.

In another optional aspect, the dispersant is in the form of an aqueous composition.

In another optional aspect, the aqueous composition of the dispersant has a solids content varying from about 30 to about 70 wt %.

In another optional aspect, the aqueous composition of the dispersant has a solid contents varying from about 50 to about 70 wt %.

The wet coating composition of claim 13, wherein the aqueous composition of the dispersant has a solids content of about 70 wt %.

In another optional aspect, the aqueous composition of the dispersant comprises a mixture of a sodium salt of an alkyl ester and 1,2-propanediol and a content of the sodium salt of alkyl ester in the aqueous composition is from about 30 wt % to about 60 wt % and the content of 1,2-propanediol is from about 10 wt % to about 30 wt %.

In another optional aspect, the aqueous composition of the dispersant has a density of about 1 g/ml.

In another optional aspect, the aqueous composition of the dispersant has a surface tension of about 25 mN/m.

In another optional aspect, the first aqueous emulsion has a solids content varying from about 5 to about 25 wt %.

In another optional aspect, the first aqueous emulsion has a solids content varying from about 15 to about 25 wt %.

In another optional aspect, the first aqueous emulsion has a solids content varying from about 20 to about 25 wt %.

In another optional aspect, the second aqueous emulsion has a solids content varying from about 1 to about 35 wt %.

In another optional aspect, the second aqueous emulsion has a solids content varying from about 20 to about 35 wt %.

In another optional aspect, the second aqueous emulsion has a solids content varying from about 30 to about 35 wt %.

In another optional aspect, the first aqueous emulsion is present in at least about 60 wt % of the total weight of the wet coating composition.

In another optional aspect, the first aqueous emulsion is present in at least about 80 wt % of the total weight of the wet coating composition.

In another optional aspect, the first aqueous emulsion is present in at least about 88 wt % of the total weight of the wet coating composition.

In another optional aspect, the dispersant is in the form of an aqueous composition which is present in about 5 wt % or less of the total weight of the wet coating composition.

In another optional aspect, the dispersant is in the form of an aqueous composition which is present in less than about 2 wt % of the total weight of the wet coating composition.

In another optional aspect, the first aqueous emulsion comprises a mixture of C10-C35 paraffins.

In another optional aspect, the first aqueous emulsion has a weight percentage of paraffin of about 45 to about 60 wt % based on the total weight of solids of the first emulsion.

In another optional aspect, the first aqueous emulsion is characterized by an onset melting temperature measured by differential scanning calorimetry (DSC) after drying thereof at room temperature, varying from about 20° C. to about 40° C.

In another optional aspect, the first aqueous emulsion is characterized by an onset melting temperature measured by DSC after drying thereof at room temperature, varying from about 20° C. to about 35° C.

In another optional aspect, the first aqueous emulsion is characterized by an end melting temperature measured by DSC after drying thereof at room temperature, varying from about 45° C. to about 90° C.

In another optional aspect, the first aqueous emulsion is characterized by an end melting temperature measured by DSC after drying thereof at room temperature, varying from about 55° C. to about 85° C.

In another optional aspect, the first aqueous emulsion has a viscosity measured at 24° C. and 100 rpm with a spindle no. 1 or 2, ranging from about 10 cP to about 200 cP.

In another optional aspect, the first aqueous emulsion has a viscosity ranging from about 15 cP to about 45 cP.

In another optional aspect, the first aqueous emulsion has a particle size distribution characterized by a Surface Weighted Mean D[3,2] less than or equal to about 0.50 μm.

In another optional aspect, the first aqueous emulsion has a particle size distribution characterized by a Surface Weighted Mean D[3,2] ranging from about 0.10 μm to about 0.50 μm.

In another optional aspect, the first aqueous emulsion has a particle size distribution characterized by a Surface Weighted Mean D[3,2] ranging from about 0.30 μm to about 0.50 μm.

In another optional aspect, the first aqueous emulsion has a particle size distribution characterized by a d(0.5) less than or equal to about 0.60 μm.

In another optional aspect, the first aqueous emulsion has a particle size distribution characterized by a d(0.5) ranging from about 0.10 μm to about 0.60 μm.

In another optional aspect, the first aqueous emulsion has a particle size distribution characterized by a d(0.5) ranging from about 0.30 μm to about 0.60 μm.

In another optional aspect, the second aqueous emulsion comprises an ethylene/acrylic acid copolymer wax or an ethylene/acrylic acid/acrylic amide copolymer wax.

In another optional aspect, the second aqueous emulsion comprises an ethylene/acrylic acid copolymer wax.

In another optional aspect, the second aqueous emulsion is characterized by an onset melting temperature measured by DSC after drying thereof at room temperature, varying from about 60° C. to about 65° C.

In another optional aspect, the second aqueous emulsion is characterized by an end melting temperature measured by DSC after drying thereof at room temperature, varying from about 90° C. to about 95° C.

In another optional aspect, the second aqueous emulsion has a viscosity measured at 24° C. and 100 rpm with a spindle no. 4, ranging from about 300 cP to about 900 cP.

In another optional aspect, the second aqueous emulsion has a viscosity measured at 24° C. and 100 rpm with a spindle no. 4, ranging from about 800 cP to about 900 cP.

In another optional aspect, the second aqueous emulsion has a particle size distribution characterized by a Surface Weighted Mean D[3,2] ranging from about 0.05 μm to about 0.2 μm.

In another optional aspect, the second aqueous emulsion has a particle size distribution characterized by a d(0.5) ranging from about 0.05 μm to about 0.2 μm.

According to another aspect, there is provided a process for treating a cellulosic fiber-based substrate comprising:

applying a coating comprising the wet coating composition as defined herein onto at least one surface of the cellulosic fiber-based substrate; and heating the coated substrate to allow migration of the coating towards a core of the cellulosic fiber-based substrate.

In one optional aspect, the process is characterized in that heating the coated substrate comprises:

drying the coating during a first phase at a drying temperature; and activating the dried coating during a second phase at an activation temperature, to allow migration thereof towards the core of the substrate.

According to another aspect, there is provided a process for treating a cellulosic fiber-based substrate comprising:

applying a coating comprising the wet coating composition as defined herein onto at least one surface of the cellulosic fiber-based substrate;

drying the coating at a drying temperature; and activating the dried coating through heating at an activation temperature, to allow migration of polymer particles comprised in the dried coating towards the core of the substrate.

In an optional aspect, the process is such that the activation temperature is higher than the drying temperature.

In another optional aspect, activating is performed at an activation temperature which is the same as the drying temperature and at an activation residence time which is longer than a drying residence time.

In another optional aspect, activating further allows migration of the dried coating towards non-coated sections of the at least one surface of the cellulosic fiber-based substrate.

In another optional aspect, applying the coating onto the at least one surface of the cellulosic fiber-based substrate comprises applying the coating discontinuously as a discontinuous pattern onto the at least one surface.

In another optional aspect, the discontinuous pattern comprises at least one of a strip pattern, a bubble pattern, and a diamond pattern of the coating applied on the at least one surface of the cellulosic fiber-based substrate, with uncoated sections extending therebetween.

In another optional aspect, applying discontinuously comprises applying spaced-apart strips of the coating on the at least one surface of the cellulosic fiber-based substrate using a rod coater provided with a toothed blade mounted against the applicator roll.

In another optional aspect, applying discontinuously comprises applying spaced-apart strips of the coating on the at least one surface of the cellulosic fiber-based substrate using a coating shower.

In another optional aspect, applying discontinuously comprises applying the coating on the at least one surface of the cellulosic fiber-based substrate using a rod coater provided with an interleaving scraper positioned between the substrate to be coated and an applicator roll, wherein the interleaving scraper is provided with perforations to form the pattern.

In another optional aspect, applying discontinuously comprises covering at least 50% of the at least one surface of the cellulosic fiber-based substrate with the coating.

In another optional aspect, applying discontinuously comprises covering at least 70% of the at least one surface of the cellulosic fiber-based substrate with the coating.

In another optional aspect, applying comprises applying the coating on both surfaces of the cellulosic fiber-based substrate.

In another optional aspect, activating allows migration of the coating throughout a thickness of the cellulosic fiber-based substrate.

In another optional aspect, the process further comprises diluting the wet coating composition in about 5 to about 50 wt % water before applying the coating onto the cellulosic fiber-based substrate.

In another optional aspect, the process comprises diluting the wet coating composition in about 5 to about 25 wt % water before applying the coating onto the cellulosic fiber-based substrate.

In another optional aspect, the drying temperature is selected to obtain a web temperature ranging from about 40 to about 95° C.

In another optional aspect, the drying temperature is selected to obtain a web temperature of about 70° C.

In another optional aspect, the activation temperature is at least about 65° C.

In another optional aspect, the activation temperature ranges from about 70° C. to about 100° C.

In another optional aspect, activating the coating comprises corrugating the cellulosic fiber-based substrate.

In another optional aspect, the cellulosic fiber-based substrate is a recycled or virgin liner, medium, chipboard, folding carton, kraftpak paper, paperboard, bag paper or any other cellulosic fiber-based substrate.

According to another aspect, there is provided a coated cellulosic fiber-based substrate obtained by the process described herein.

According to another aspect, there is provided an article comprising the coated cellulosic fiber-based substrate.

According to another aspect, there is provided a cellulosic fiber-based substrate coated with the wet coating composition as defined herein.

According to another aspect, there is provided a use of the wet coating composition as defined herein for coating a cellulosic fiber-based substrate.

According to another aspect, there is provided a cellulosic fiber-based substrate having two surfaces, the cellulosic fiber-based substrate comprising a coating applied on at least one of the two surfaces and comprising the wet coating composition as defined herein.

In an optional aspect, the coating covers substantially entirely the at least one of the two surfaces.

In another optional aspect, the at least one of the two surfaces comprises coated sections and uncoated sections, extending between coated sections.

In another optional aspect, the coated sections comprise spaced-apart strips.

In another optional aspect, the coated sections cover at least about 50% of the at least one of the two surfaces.

In another optional aspect, the coated sections cover at least about 70% of the at least one of the two surfaces.

In another optional aspect, the coating is further dried and activated to form a dry coating on the at least one surface and extending towards a core of the cellulosic fiber-based substrate.

In another optional aspect, the dry coating represents about 15 wt % of the weight of the cellulosic fiber-based substrate.

In another optional aspect, the dry coating represents about 10 wt % of the weight of the cellulosic fiber-based substrate.

In another optional aspect, the dry coating represents about 5 wt % of the weight of the cellulosic fiber-based substrate.

In another optional aspect, the dry coating represents about 2 wt % of the weight of the cellulosic fiber-based substrate.

Other objects, advantages and features of the present invention will become more apparent upon reading of the following non-restrictive description of embodiments thereof, with reference to the accompanying drawings.

Figure 8:
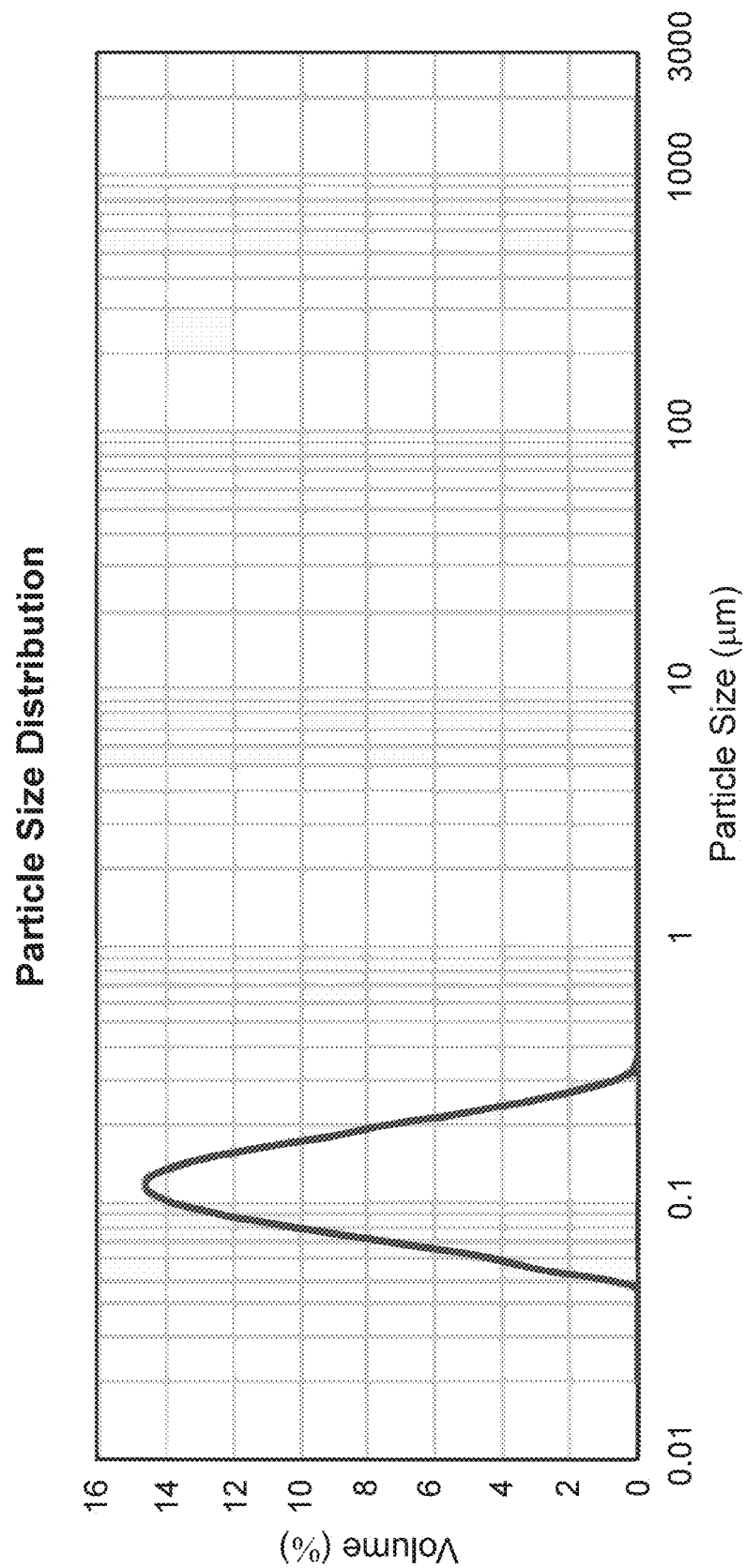

FIG. 8 represents the particle size distribution of aqueous emulsion 2. The analysis was performed using a Mastersizer 2000™ equipped with a Hydro 2000S™ wet dispersion unit, from Malvern Instruments.

Figure 9A:
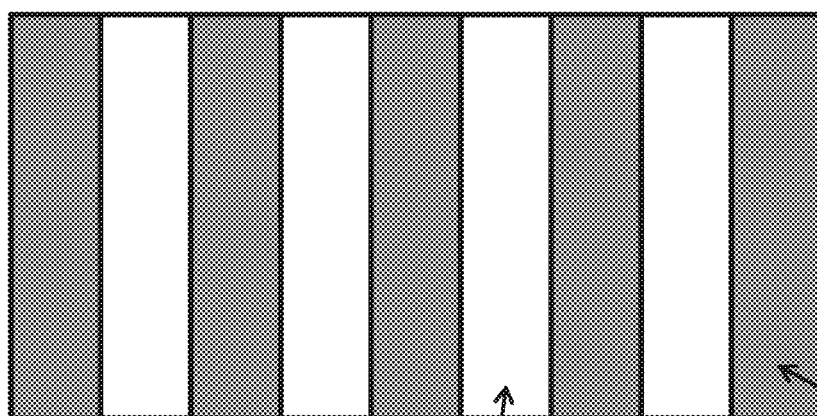
Figure 9B:
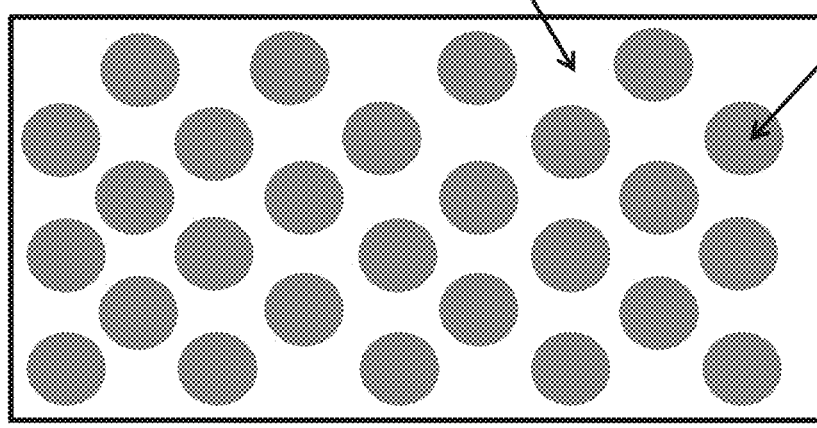
Figure 9C:
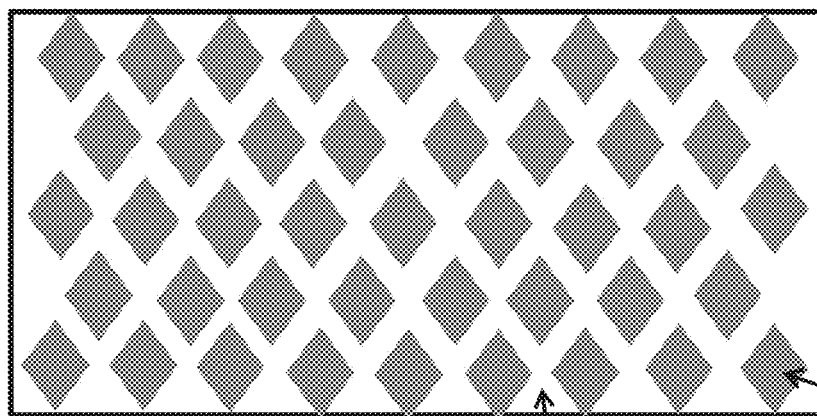

FIG. 9 includes FIGS. 9A, 9B and 9C and represents three application patterns of a wet coating composition applied discontinuously onto a substrate surface according to embodiments.

Figure 10A:
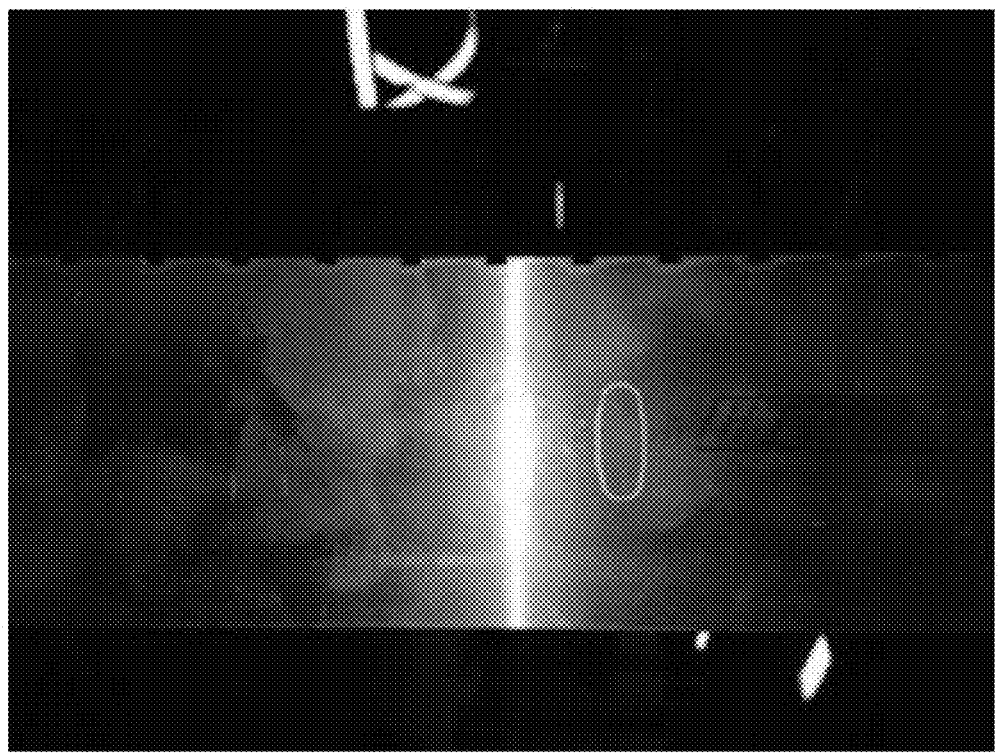
Figure 10B:
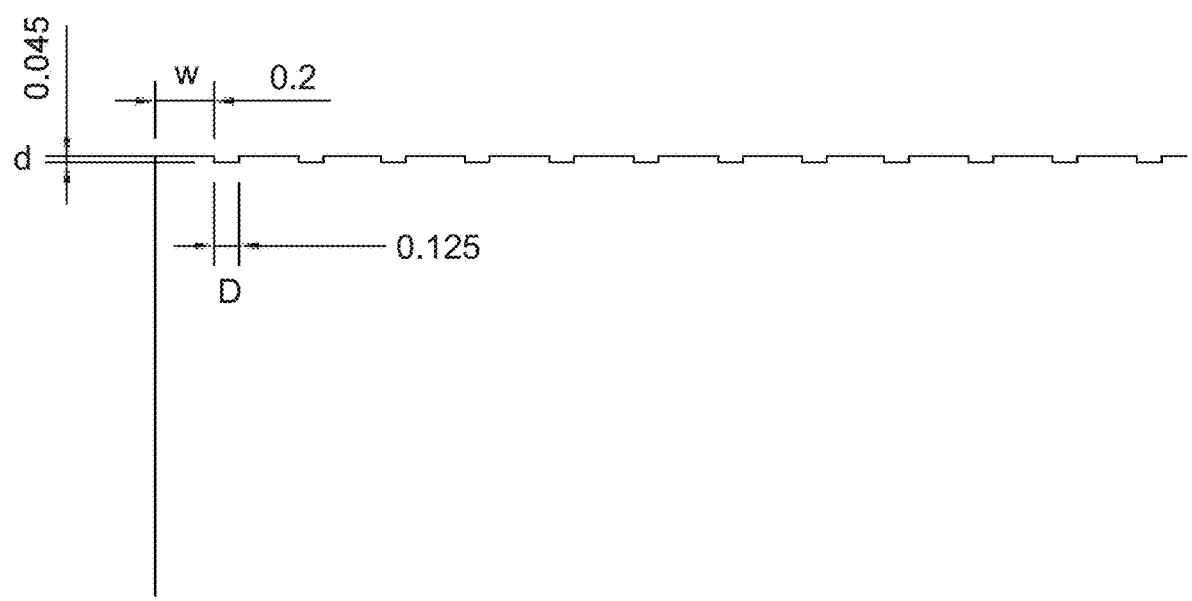

FIG. 10 includes FIGS. 10A and 10B and represents a toothed blade which can be used to apply the wet coating composition discontinuously onto the substrate surface according to an embodiment. FIG. 10A is a photograph of the toothed blade and FIG. 10B is a schematic representation of the toothed blade.

Figure 11:
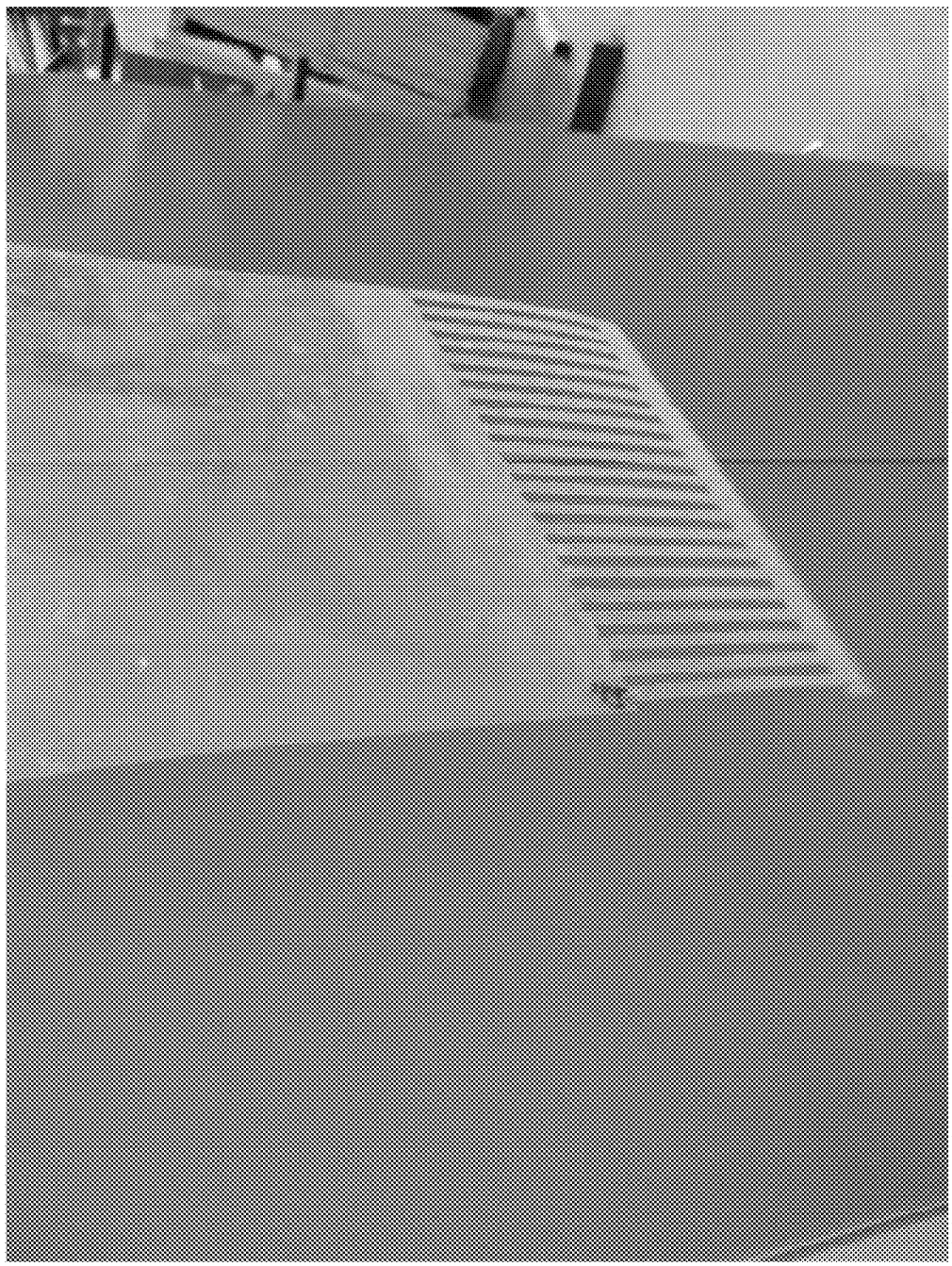

FIG. 11 is a photograph of an interleaving scraper that can be used for application of the wet coating composition according to an embodiment.

Figure 12A:
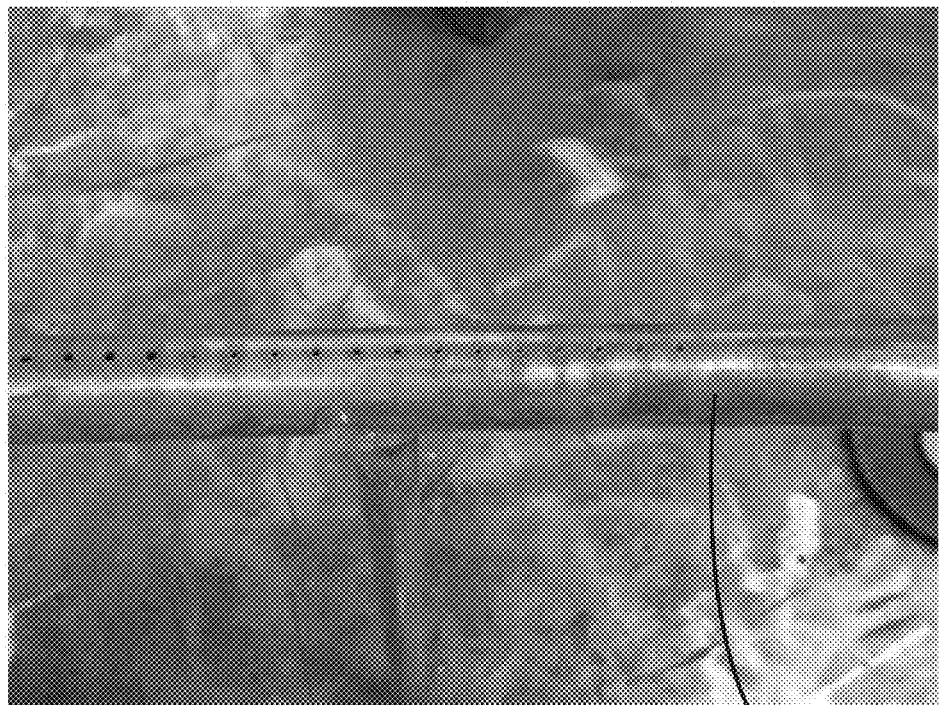
Figure 12B:

FIG. 12 includes FIGS. 12A and 12B which are photographs showing a tube shower that can be used for application of the wet coating composition according to an embodiment.

Figure 13A:
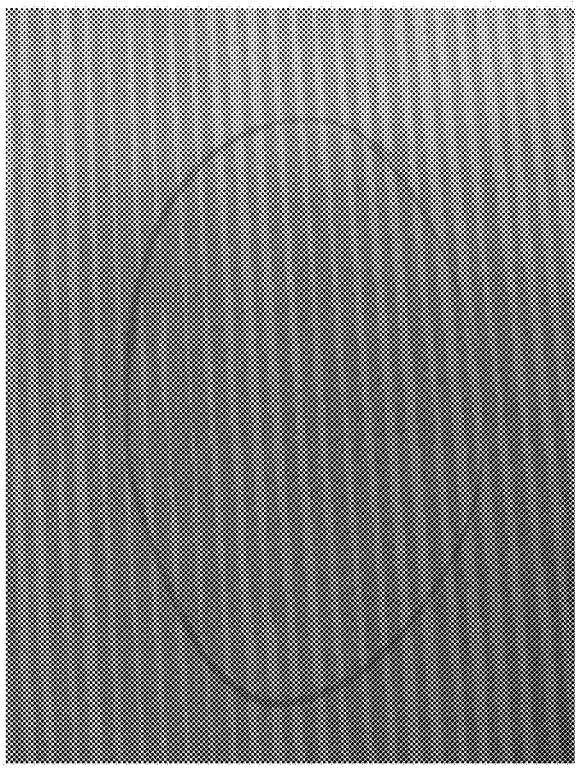

FIG. 13A is a photograph of a substrate surface coated with the wet coating composition according to an embodiment, wherein the composition is applied discontinuously in strips regularly spaced onto the surface.

Figure 13B:
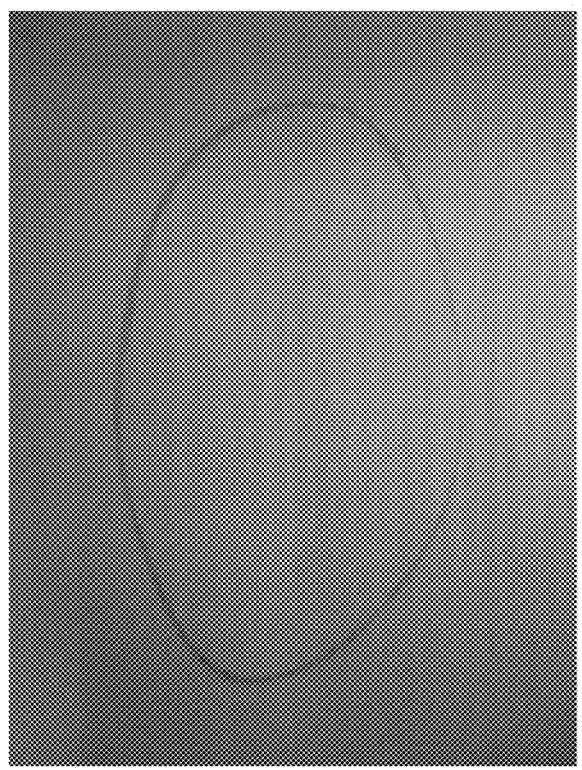

FIG. 13B is a photograph of the coated substrate surface of FIG. 13A showing the surface thereof after activation according to an embodiment.

Figure 14B:
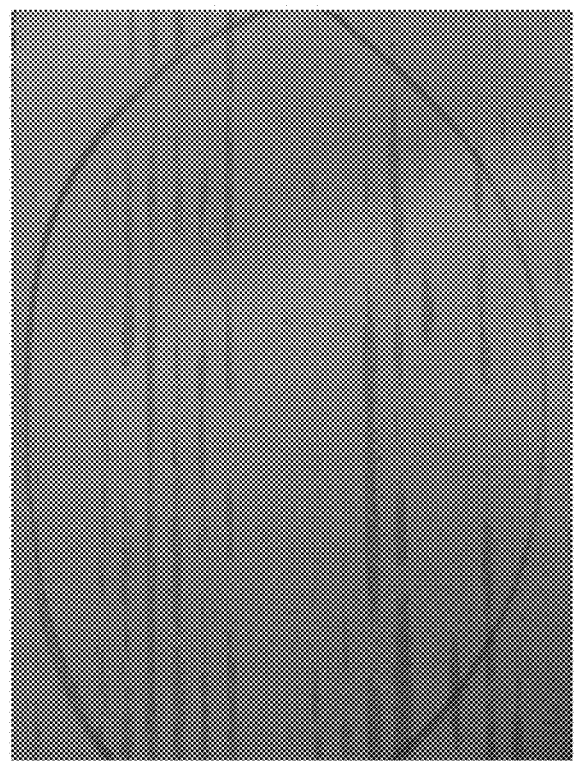
Figure 14A:
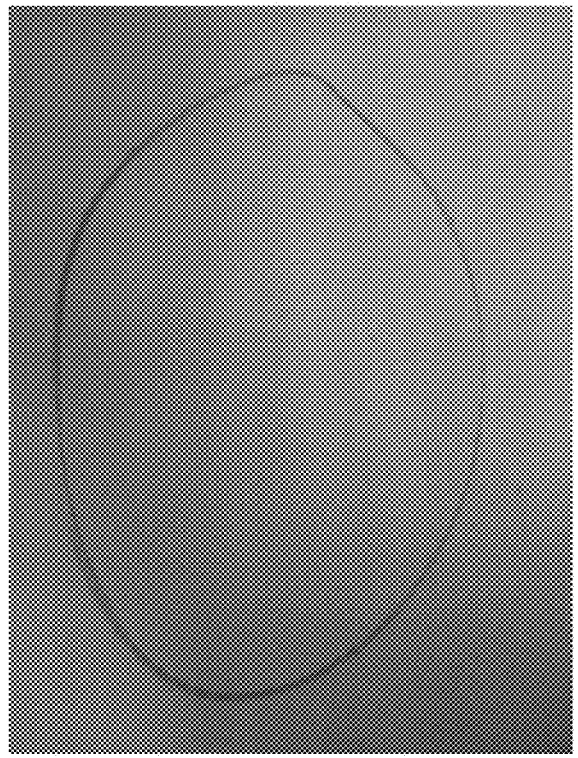

FIG. 14A is a photograph of a substrate surface coated with the wet coating composition according to an embodiment, wherein the composition is applied discontinuously onto small sections of the substrate surface, leaving relatively wide uncovered sections.

FIG. 14B is a photograph of the coated substrate surface of FIG. 14A showing the surface thereof after activation according to an embodiment.

Figure 15B:
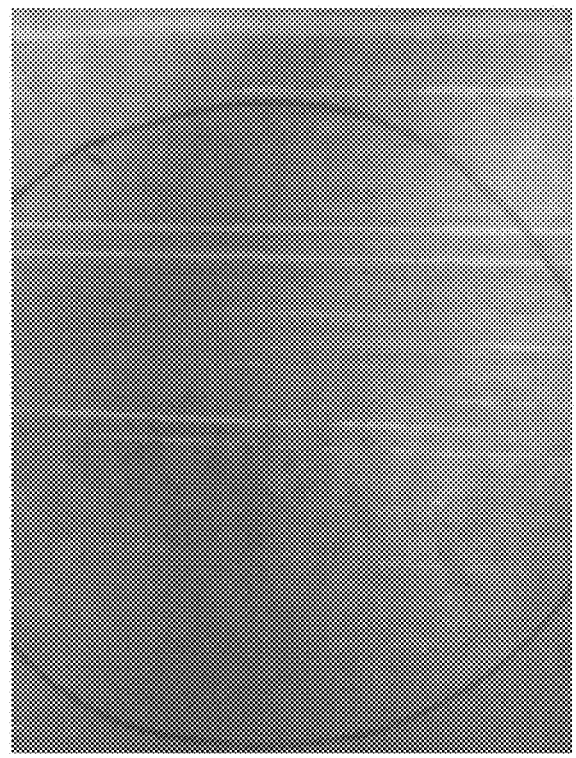
Figure 15A:
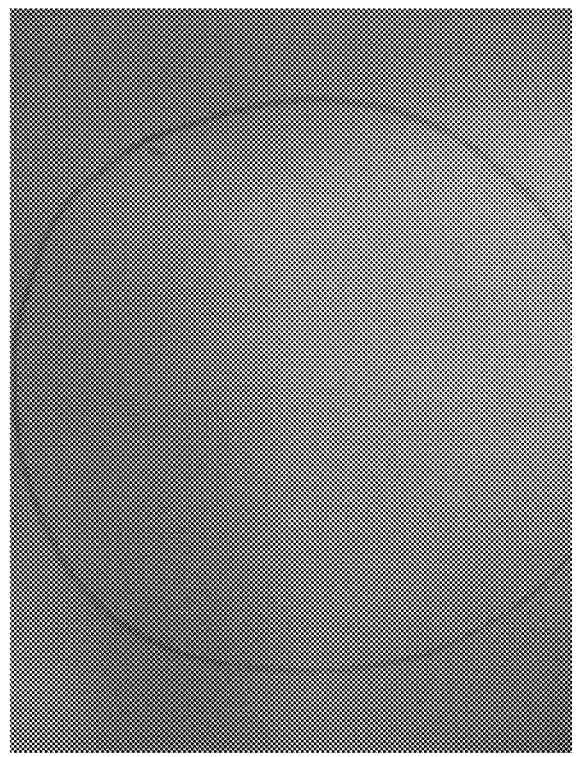

FIG. 15A is a photograph of a substrate surface coated with the wet coating composition according to an embodiment, wherein the composition is applied discontinuously as superimposed strips onto the surface covering wide sections of the surface and leaving narrow uncovered sections.

FIG. 15B is an image of the coated substrate of FIG. 15A showing the surface thereof after activation according to an embodiment.

DETAILED DESCRIPTION

A wet coating composition providing water-resistance to cellulosic fiber-based substrates coated with such composition will be described.

In the present description the expression "cellulosic fiber-based substrate" is used to refer to any type of cellulosic fiber-based substrate including for example, and without being limited to, any suitable wood-fiber based material, such as recycled or virgin liner, medium, chipboard, paperboard, folding carton, kraftpak paper, bag paper, and the like. The expression "paper substrate" will also be used in the following description to commonly refer to any cellulosic fiber-based substrate.

Broadly described, the wet coating composition is an aqueous mixture of an oxidized paraffin/polyethylene wax emulsion with an ethylene/acrylic based copolymer wax emulsion. A dispersant can also be present in the mixture for improving the stability of the oxidized paraffin/polyethylene wax emulsion. The wet coating composition once coated onto the paper substrate and dried provides water-resistance properties to the substrate.

By its nature, the oxidized paraffin/polyethylene wax has a relatively low polarity. If it provides good water-resistance properties, it has however a relatively poor gluability with water-based adhesives. The addition of an acrylic/ethylene based copolymer wax with a suitable polarity has allowed obtaining a "gluable" coating while maintaining water-resistance provided at least by the oxidized paraffin/polyethylene wax.

The combination of an oxidized paraffin/polyethylene wax having a predetermined surface energy and an ethylene/acrylic based copolymer wax having a complementary predetermined surface energy allows obtaining a final coating that is gluable and shows improved water barrier properties.

The surface energy of a substrate can be defined as a measure of energy required to form a unit area of new surface at the solid-gas interface. Surface energy is an essential component in estimating wettability of a solid surface with a liquid and hence to characterize the solid-liquid interface interaction properties. The surface energy of a substrate can be defined at the interaction between the forces of cohesion and the forces of adhesion which determines whether or not wetting, i.e. the spreading of a liquid over the substrate's surface, occurs. If complete wetting does not occur, then a bead of liquid will form, with a contact angle which is a function of the surface energy of the system. The contact angle of a liquid on the surface of a substrate can be measured using the sessile drop method and hence the surface energy of the substrate can be estimated. The surface energy is expressed as "force/length" in Newton per meter (N/m).

The surface energy is assumed to be the sum of two components: the dispersive energy and the polar energy. For example, the equation describing the subdivision of surface energy into the contributions of dispersive interactions and polar interactions is:

$$\sigma_S = \sigma_S^D + \sigma_S^P$$

where $\sigma_S$ is the total surface energy of the substrate, and $\sigma_S^D$ and $\sigma_S^P$ are respectively the dispersive and polar components of the surface energy.

As mentioned above, the wet coating composition includes an oxidized paraffin/polyethylene wax emulsion and an ethylene/acrylic based copolymer wax emulsion. The oxidized paraffin/polyethylene wax has a predetermined surface energy which is substantially the resultant of dispersive contributions. The ethylene/acrylic based copolymer wax has a complementary predetermined surface energy. By "complementary", it is meant that the surface energy of the ethylene/acrylic based copolymer wax complements the surface energy of the oxidized paraffin/polyethylene wax in such a way that the dry coating on the paper substrate will show a surface energy being the resultant of both dispersive and polar contributions. In other words, the surface energy of the ethylene/acrylic based copolymer wax will be said to be "complementary" as it will bring polar contributions to the surface energy of the coated substrate.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In an embodiment, the wet coating composition comprises a mixture of i) an aqueous emulsion of an oxidized paraffin/polyethylene wax, and ii) an aqueous emulsion of an ethylene/acrylic acid copolymer wax, an ethylene/acrylic amide copolymer wax, an ethylene/acrylic acid/acrylic amide copolymer wax or any mixture of these copolymer waxes. The oxidized paraffin/polyethylene wax has a surface energy less than or equal to about 25 mN/m being substantially dispersive energy. The dry coating resulting from the wet coating composition has a surface energy ranging from about 20 to about 60 mN/m being the sum of dispersive and polar energies. In an embodiment, the dry coating resulting from the wet coating composition has a surface energy ranging from about 21 to about 34 mN/m. In another embodiment, the surface energy of the dry coating can be about 24-25 mN/m.

In another embodiment, the wet coating composition used to make the coating on the paper substrate surface further comprises a dispersant for improving the stability of the aqueous emulsion of the oxidized paraffin/polyethylene wax in the wet coating composition.

Oxidized Paraffin/Polyethylene Wax Emulsion

A first component present in the wet coating composition is an aqueous emulsion comprising a wax based on paraffin and polyethylene. The wax is oxidized for facilitating emulsification. In other words, the wax comprises an oxidized paraffin and an oxidized polyethylene and one refers to an "oxidized paraffin/polyethylene wax" in the present description. This oxidized paraffin/polyethylene wax provides water-resistance properties to the coating.

As mentioned above, the oxidized paraffin/polyethylene wax emulsion according to an embodiment is characterized in that the oxidized paraffin/polyethylene wax has a surface energy less than or equal to about 25 mN/m being substantially dispersive energy. In another embodiment, the surface energy of the oxidized paraffin/polyethylene wax can range from about 15 to about 20 mN/m. In some embodiments, the surface energy of the oxidized paraffin/polyethylene wax can be about 16-17 mN/m.

As mentioned above, the surface energy can be determined using the sessile drop method. The method generally involves placing a droplet of liquid with a known surface energy on the solid substrate and to calculate the surface energy of the substrate from the shape of the drop, specifically the contact angle with the surface of the solid, and the known surface energy of the liquid. The liquid used for such experiments is referred to as the probe liquid, and the use of several different probe liquids is required. In an embodiment, the surface energy is determined by the Owens-Wendt-Rabel-Kaelble method, which also allows determining the polar and dispersive components of the surface energy. The probe liquids can be water (e.g. deionized water), benzyl alcohol and ethylene glycol. An example of apparatus that can be used to determine the surface energy, and its polar and dispersive components, is a Drop Shape Analyzer DSA100™ from the company Krüss.

The surface energy of the oxidized paraffin/polyethylene wax can thus be determined as mentioned above after application and drying of the oxidized paraffin/polyethylene wax emulsion on a paper substrate surface. Similarly, the surface energy of the coating resulting from the wet coating composition, after application and drying thereof onto the paper substrate surface, can be determined by the sessile drop technique. In one embodiment, the surface energy can be determined on the paper substrate coated with at least about 2 wt % of the wax or the dry coating.

As previously mentioned the surface energy of the oxidized paraffin/polyethylene wax is "substantially" dispersive energy. This means that the contribution of polar interactions is very low, for example less than 1% of the total surface energy, or even less than 0.5%. In an embodiment, the polar component of the surface energy can be substantially inexistent. Hence, in an embodiment, the surface energy may be essentially dispersive energy.

According to an embodiment, the paraffin present in the oxidized paraffin/polyethylene wax emulsion has a melting point below about 65° C. In another embodiment, the paraffin present in the oxidized paraffin/polyethylene wax emulsion may comprise a mixture of paraffins containing between about 10 and 35 carbon atoms. In an embodiment, the weight percentage of paraffins can range from about 45 wt % to about 60 wt % based on the total weight of solids of the emulsion. In another embodiment, this weight percentage of paraffins can range from about 49 wt % to about 59 wt %. An example of a technique that can be used to determine the concentration of paraffins is GC-MS (gas chromatography coupled with mass spectrometry).

The oxidized paraffin/polyethylene wax emulsion may for example comprise from about 50 to about 95 wt % water. In an embodiment, it includes about 75 wt % to about 85 wt % water. In another embodiment, the oxidized paraffin/polyethylene wax emulsion includes about 75 wt % water and about 25 wt % of the oxidized paraffin/polyethylene wax. In other words, the solids content of the oxidized paraffin/polyethylene wax emulsion may vary from about 5 wt % to about 50 wt %, or from about 25 wt % to about 50 wt %, or from about 15 wt % to about 25 wt %. In an embodiment, the solids content of the oxidized paraffin/polyethylene wax emulsion is from about 20 to about 25 wt %.

The oxidized paraffin/polyethylene wax emulsion may be characterized by its onset melting temperature and end melting temperature as measured by differential scanning calorimetry (DSC) after drying at room temperature. In an embodiment, the onset melting temperature of the dried oxidized paraffin/polyethylene wax emulsion may range from about 20° C. to about 40° C. In another embodiment, the onset melting temperature may range from about 20° C. to about 35° C. The end melting temperature of the dried oxidized paraffin/polyethylene wax emulsion may range from about 45° C. to about 90° C. In an embodiment, the end melting temperature of the dried oxidized paraffin/polyethylene wax emulsion may range from about 55° C. to about 85° C. An example of apparatus that can be used to determine the melting temperatures of the wax emulsions is a DSC 7 from the company Perkin Elmer.

The oxidized paraffin/polyethylene wax emulsion may also be characterized by its viscosity. In an embodiment, the viscosity of the oxidized paraffin/polyethylene wax emulsion, measured using a Brookfield Viscometer at 24° C. and 100 rpm with a spindle no. 1 or 2, may range from about 10 cP to about 200 cP. In another embodiment, the viscosity of the oxidized paraffin/polyethylene wax emulsion, measured using a Brookfield Viscometer at 24° C. and 100 rpm with a spindle no. 1 or 2, may range from about 15 cP to about 45 cP.

The oxidized paraffin/polyethylene wax emulsion may further be characterized by its particle size distribution and particularly by the Surface Weighted Mean D[3,2] value and the d(0.5) value. In an embodiment, the particle size distribution of the oxidized paraffin/polyethylene wax emulsion is such that the Surface Weighted Mean D[3,2] is less than or equal to about 0.50 µm. In another embodiment, the D[3,2] can range from about 0.10 µm to about 0.50 µm, or even can range from about 0.30 µm to about 0.50 µm. In another embodiment, the particle size distribution of the oxidized paraffin/polyethylene wax emulsion is such that the d(0.5) is less than or equal to about 0.60 µm. The d(0.5) can for example range from about 0.10 µm to about 0.60 µm, or even from about 0.30 µm to about 0.60 µm.

The particle size distribution can be determined using common methods, such as for example by laser diffraction. An example of apparatus that can be used for measuring the particle size distribution is a Mastersizer 2000™ equipped with a Hydro 2000S™ wet dispersion unit, from Malvern Instruments.

The aqueous oxidized paraffin/polyethylene wax emulsion may therefore present any of the above described characteristics, or may present any combination of these properties.

According to an embodiment, the aqueous oxidized paraffin/polyethylene wax emulsion, referred to as aqueous emulsion 1A, may be characterized in that:
- the oxidized paraffin/polyethylene wax has a surface energy of about 16-17 mN/m being more than 99% dispersive energy;
- it comprises a mixture of paraffins containing between 10 and 35 carbon atoms;
- the weight percentage of paraffins is about 60 wt % based on the total weight of solids in the emulsion;
- its solids content is about 22 wt %;
- the dried emulsion has an onset melting temperature of about 23° C. and an end melting temperature of about 56° C., as measured by DSC;
- its viscosity at 24° C. and 100 rpm using a spindle no. 1 is about 16 cP; and
- its particle size distribution is such that the Surface Weighted Mean D[3,2] is about 0.47 µm and the d(0.5) is about 0.56 µm.

Figure 1:
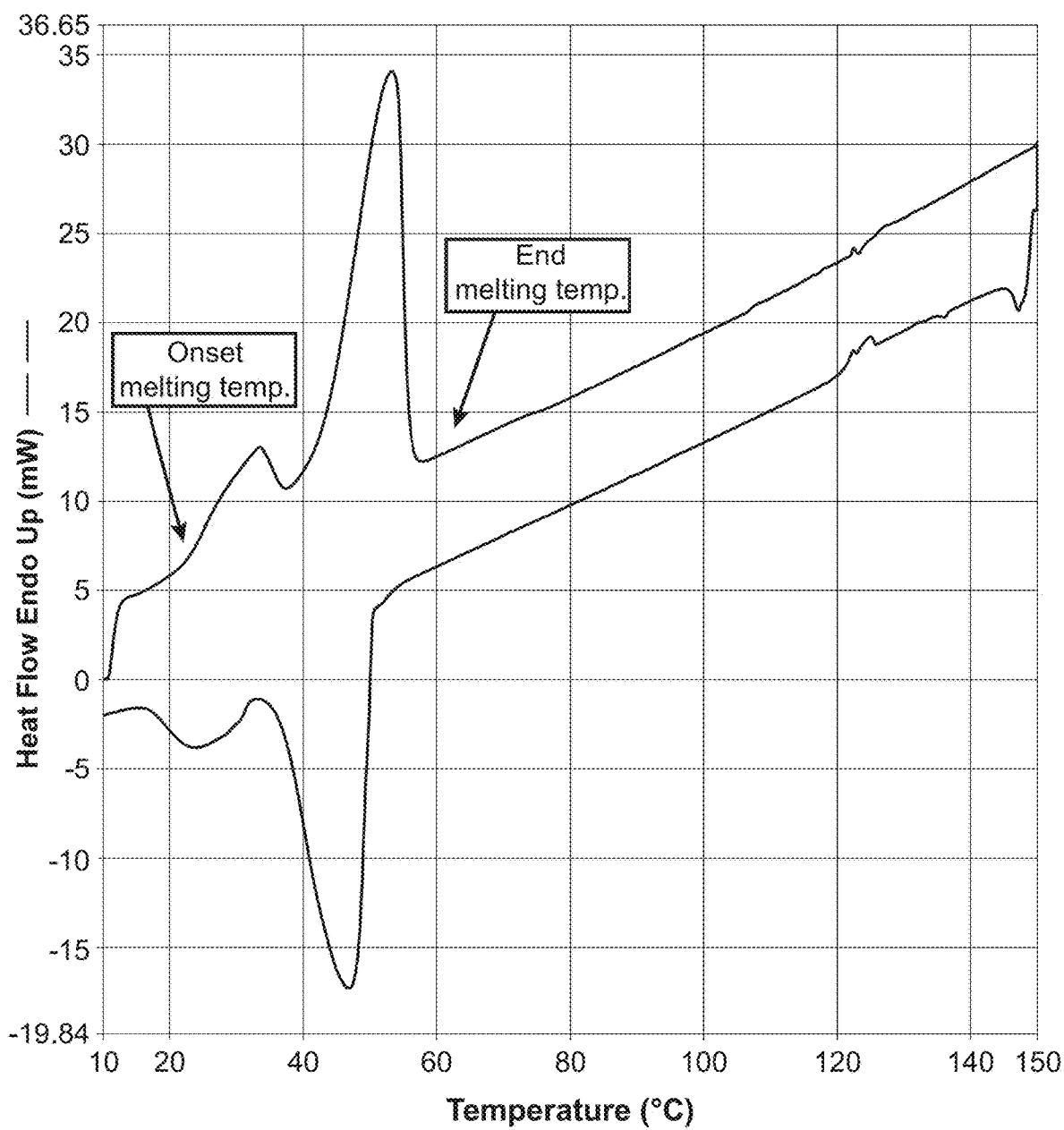
FIG. 1 is a DSC thermogram of an aqueous oxidized paraffin/polyethylene wax emulsion (aqueous emulsion 1A) used in the wet coating composition, according to an embodiment. The DSC analysis was performed on a DSC 7 apparatus from Perkin Elmer, after drying the emulsion, and using the following temperature program: a) hold for 1.0 min at 10° C.; b) heat from 10° C. to 150° C. at 10° C./min; c) hold for 0.5 min at 150° C.; d) cool from 150° C. to 10° C. at 10° C./min.
Figure 2:
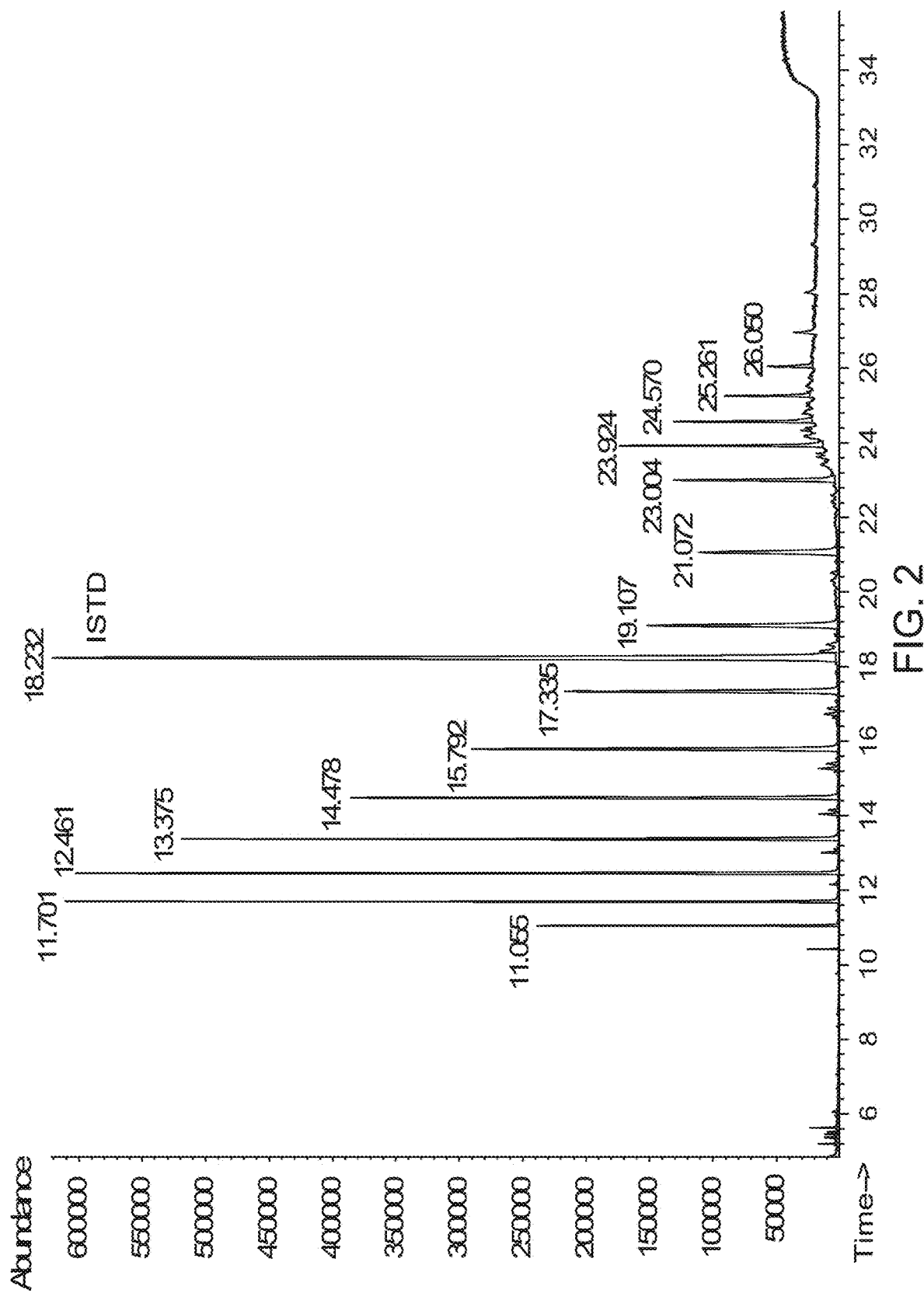
FIG. 2 is a GC-MS chromatogram of paraffins present in aqueous emulsion 1A. The measure was performed on a GC system HP6890 combined with a 5973 Mass Selective Detector from Hewlett Packard.
Figure 3:
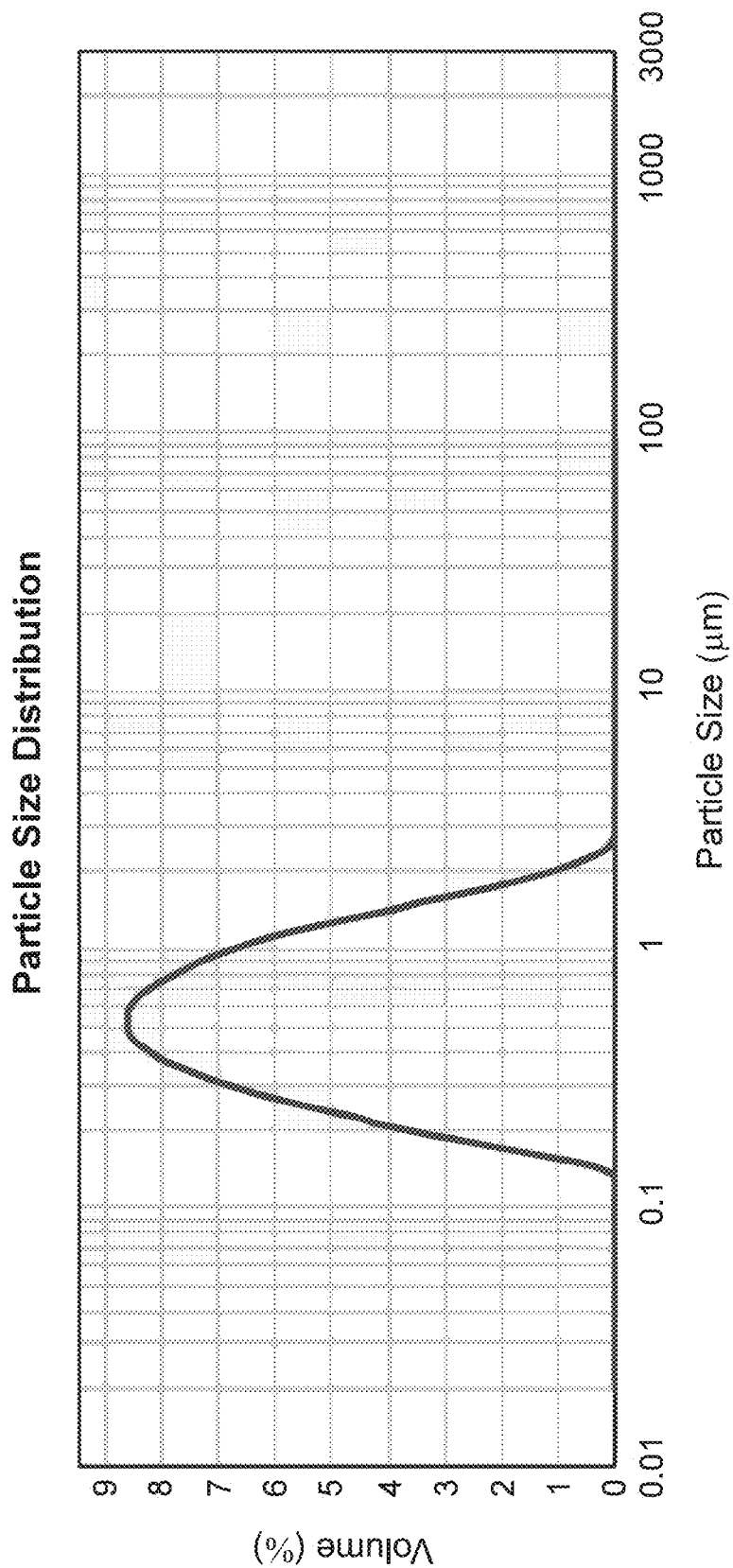
FIG. 3 represents the particle size distribution of aqueous emulsion 1A. The analysis was performed using a Mastersizer 2000™ equipped with a Hydro 2000S™ wet dispersion unit, from Malvern Instruments.

FIG. 1 represents a DSC chromatogram obtained for the dried aqueous emulsion 1A. FIG. 2 represents a GC-MS chromatogram of paraffins present in the same aqueous emulsion 1A and FIG. 3 represents the particle size distribution of aqueous emulsion 1A.

According to another embodiment, the aqueous oxidized paraffin/polyethylene wax emulsion, referred to as aqueous emulsion 1B, may be characterized in that:
- the oxidized paraffin/polyethylene wax has a surface energy of about 16-17 mN/m being more than 99% dispersive energy;
- it comprises a mixture of paraffins containing between 10 and 35 carbon atoms;
- the weight percentage of paraffins is about 50 wt % based on the total weight of solids in the emulsion;
- its solids content is about 50 wt %;
- the dried emulsion has an onset melting temperature of about 34° C. and an end melting temperature of about 82° C., as measured by DSC;
- its viscosity at 24° C. and 100 rpm using a spindle no. 2 is about 43 cP; and
- its particle size distribution is such that the Surface Weighted Mean D[3,2] is about 0.33 µm and the d(0.5) is about 0.36 µm.

Figure 4:
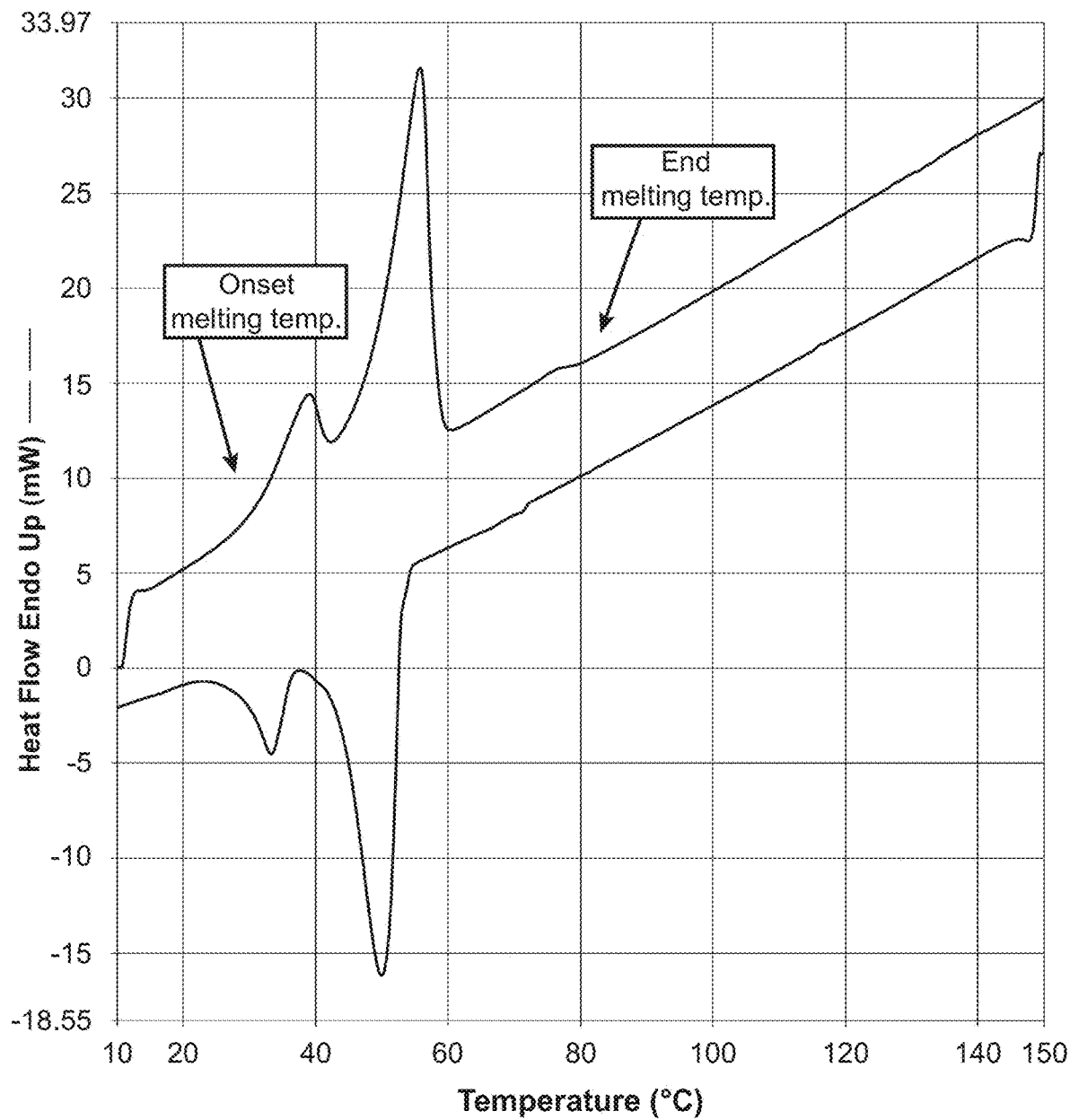
FIG. 4 is a DSC thermogram of an aqueous oxidized paraffin/polyethylene wax emulsion (aqueous emulsion 1B) used in the wet coating composition, according to another embodiment. The DSC analysis was performed on a DSC 7 apparatus from Perkin Elmer, after drying the emulsion, and using the following temperature program: a) hold for 1.0 min at 10° C.; b) heat from 10° C. to 150° C. at 10° C./min; c) hold for 0.5 min at 150° C.; d) cool from 150° C. to 10° C. at 10° C./min.
Figure 5:
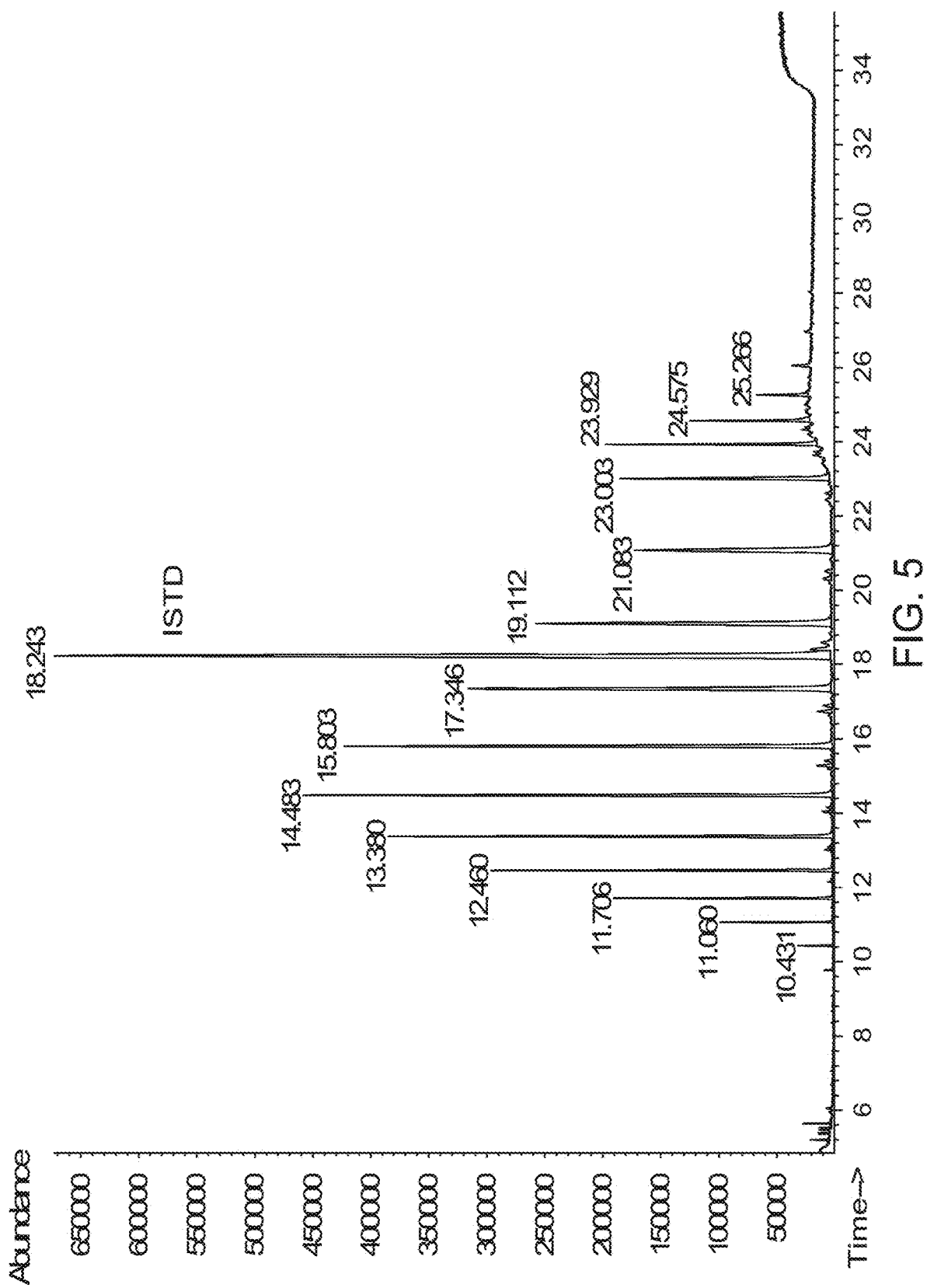
FIG. 5 is a GC-MS chromatogram of paraffins present in aqueous emulsion 1B. The measure was performed on a GC system HP6890 combined with a 5973 Mass Selective Detector from Hewlett Packard.
Figure 6:
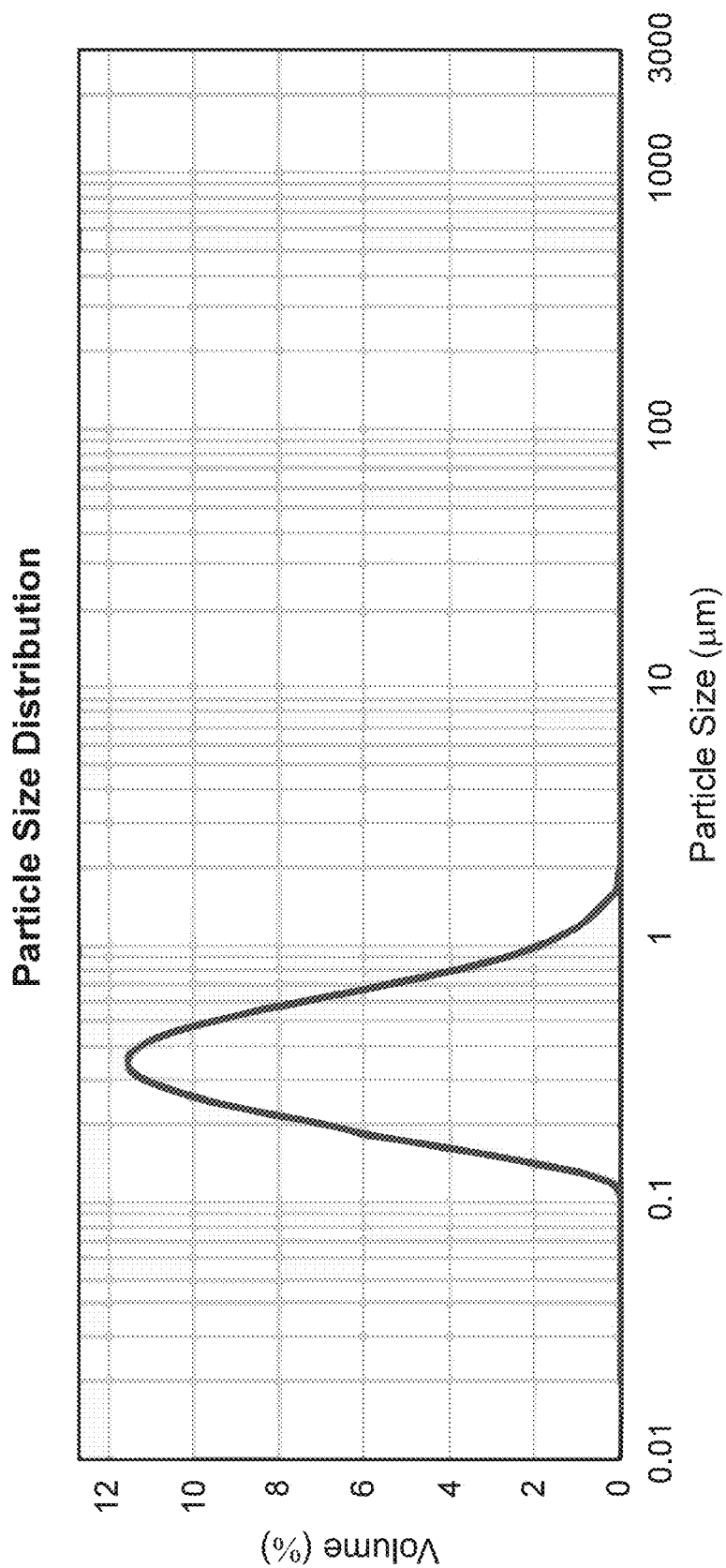
FIG. 6 represents the particle size distribution of aqueous emulsion 1B. The analysis was performed using a Mastersizer 2000™ equipped with a Hydro 2000S™ wet dispersion unit, from Malvern Instruments.

FIG. 4 represents a DSC chromatogram obtained for the dried aqueous emulsion 1B. FIG. 5 represents a GC-MS chromatogram of paraffins present in the same aqueous emulsion 1B and FIG. 6 represents the particle size distribution of aqueous emulsion 1B.

In an embodiment, the above oxidized paraffin/polyethylene wax emulsion 1B can be diluted before mixing with the acrylic/ethylene based copolymer wax emulsion, and the dispersant when present, to obtain the wet coating composition. For example, it can be diluted to reach a solid content of about 20-25 wt %. However, in another embodiment, the oxidized paraffin/polyethylene wax emulsion is mixed with the other ingredients of the wet coating composition as is, and dilution can be done later, if required, when all the ingredients are mixed up, to reach a desired solid content.

Acrylic/Ethylene Based Copolymer Wax Emulsion

Another component present in the wet coating composition is an aqueous emulsion comprising at least one ethylene/acrylic based copolymer wax. The ethylene/acrylic based copolymer wax is a wax comprising a copolymer based on ethylene and acrylic monomers. The acrylic monomers may be an acrylic acid, an acrylic amide or a mixture thereof. Hence, the ethylene/acrylic based copolymer wax may be an ethylene/acrylic acid copolymer wax, an ethylene/acrylic amide copolymer wax, an ethylene/acrylic acid/acrylic amide copolymer wax or any mixture thereof. With the presence of polymerized ethylene moieties, the copolymer wax provides some water resistance to the dry coating. The presence of the acrylic moieties further promotes adhesion (gluability) to polar substrates such as cellulosic fibers substrates.

As mentioned above, the wax of the ethylene/acrylic based copolymer wax emulsion according to an embodiment has a "complementary" surface energy, such that the dry coating resulting from the wet coating composition will have a surface energy including both polar and dispersive components. In an embodiment, the ethylene/acrylic based copolymer wax is such that the surface energy of the final coating will range from about 20 to about 60 mN/m being the sum of dispersive and polar energies. In another embodiment, the surface energy of the final coating can range from about 21 to about 34 mN/m.

The aqueous ethylene/acrylic based copolymer wax emulsion may comprise from about 65 to about 99 wt % water. In an embodiment, it comprises from about 65 to about 80 wt % water. In another embodiment, the ethylene/acrylic based copolymer wax emulsion includes about 65-70 wt % water and 30-35 wt % of the copolymer wax. In other words, the solids content of the aqueous ethylene/acrylic based copolymer wax emulsion may vary from about 1 wt % to about 35 wt %, or from about 20 wt % to 35 wt %. In an embodiment, the solids content of the aqueous ethylene/acrylic based copolymer wax emulsion is about 30-35 wt %, for instance 32 wt %.

In an embodiment, the copolymer wax is an ethylene/acrylic acid copolymer wax or an ethylene/acrylic acid/acrylic amide copolymer wax.

The aqueous ethylene/acrylic based copolymer wax emulsion may be characterized by its onset melting temperature and end melting temperature as measured by differential scanning calorimetry (DSC) after air drying at room temperature.

In an embodiment, the onset melting temperature of the dried ethylene/acrylic based copolymer wax emulsion may range from about 60° C. to 65° C. In another embodiment, the onset melting temperature of the dried ethylene/acrylic based copolymer wax emulsion is about 62° C. The end melting temperature of the dried ethylene/acrylic based copolymer wax emulsion may range from about 90° C. to about 95° C. In an embodiment, the end melting temperature of the dried ethylene/acrylic based copolymer wax emulsion is about 93° C.

The aqueous ethylene/acrylic based copolymer wax emulsion may also be characterized by its viscosity. In an embodiment, the viscosity of the aqueous ethylene/acrylic based copolymer wax emulsion, measured using a Brookfield Viscometer at 24° C. and 100 rpm with a spindle no. 4, may range from about 300 cP to about 900 cP, or from about 700 cP to about 900 cP, or from about 800 cP to about 900 cP. In another embodiment, the viscosity of the aqueous ethylene/acrylic based copolymer wax emulsion, measured using a Brookfield Viscometer at 24° C. and 100 rpm with a spindle no. 4, can be about 840-850 cP.

The aqueous ethylene/acrylic based copolymer wax emulsion may further be characterized by its particle size distribution and particularly by the Surface Weighted Mean D[3,2] value and the d(0.5) value. In an embodiment, the particle size distribution of the aqueous ethylene/acrylic based copolymer wax emulsion is such that the Surface Weighted Mean D[3,2] ranges from about 0.05 μm to about 0.2 μm. In another embodiment, the particle size distribution of the aqueous ethylene/acrylic based copolymer wax emulsion is such that the d(0.5) ranges from about 0.05 μm to about 0.2 μm.

The ethylene/acrylic based copolymer wax emulsion may therefore present any of the above described characteristics, or may present any combination of these properties.

According to another embodiment, the aqueous ethylene/acrylic based copolymer wax emulsion, referred to as aqueous emulsion 2, may be characterized in that:
  it comprises an ethylene/acrylic acid copolymer wax;
  its solids content is about 32 wt %;
  the dried emulsion has an onset melting temperature of about 62° C. and an end melting temperature of about 93° C., as measured by DSC;
  its viscosity at 24° C. and 100 rpm using a spindle no. 4 is about 844 cP; and
  its particle size distribution is such that the Surface Weighted Mean D[3,2] is about 0.112 μm and the d(0.5) is about 0.120 μm.

Figure 7:
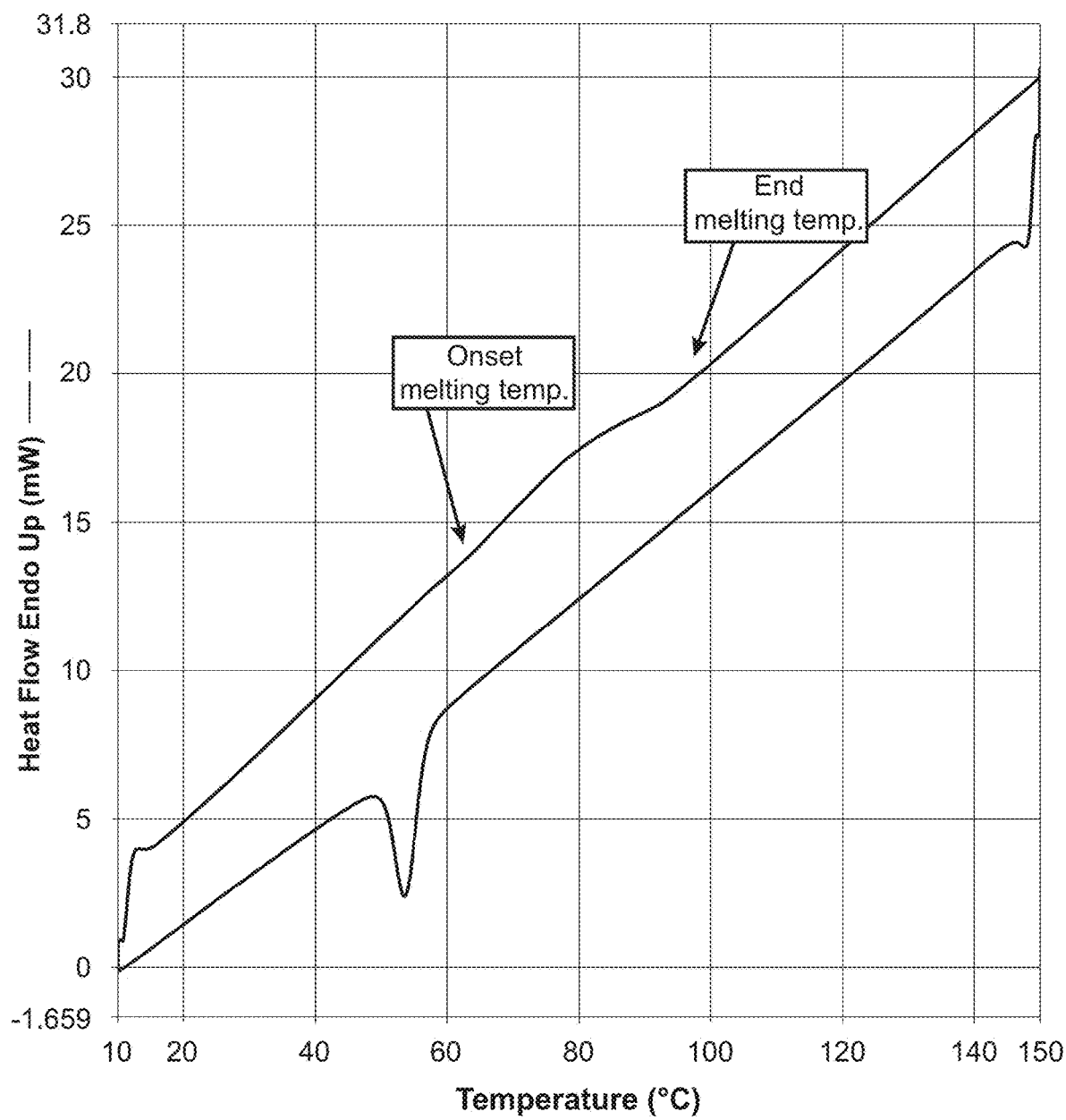
FIG. 7 is a DSC thermogram of an aqueous ethylene/acrylic acid copolymer wax emulsion (aqueous emulsion 2) used in the wet coating composition, according to an embodiment. The DSC analysis was performed on a DSC 7 apparatus from Perkin Elmer, after drying the emulsion, and using the following temperature program: a) hold for 1.0 min at 10° C.; b) heat from 10° C. to 150° C. at 10° C./min; c) hold for 0.5 min at 150° C.; d) cool from 150° C. to 10° C. at 10° C./min.

FIG. 7 represents a DSC chromatogram obtained for the dried aqueous emulsion 2. FIG. 8 represents the particle size distribution of aqueous emulsion 2.

Dispersant

The dispersant, when present in the wet coating composition, is used for improving the stability of the oxidized paraffin/polyethylene wax emulsion in water. The use of a dispersant can also improve substrate wetting.

In an embodiment, the dispersant used in the wet coating composition is an anionic surfactant. It may be a salt of a polyacrylic acid, a salt of a polyacrylamide, a salt of a carboxylic acid, a mixture of a salt of an alkyl ester and an alkyl diol, or any mixture thereof.

The term "alkyl" as used herein refers to linear or branched alkyl group. A "diol" is intended to mean a di-alcohol, i.e. "alkyl diol" means a linear or branched alkyl group having two hydroxyl groups. For example, the alkyl diol can be 1,2-propanediol (propylene glycol). "Alkyl ester" refers to a molecule of the formula $R^1C(=O)OR^2$, where $R^1$ and $R^2$ are "alkyl groups" as defined above.

The carboxylic acid may contain up to about 30 carbon atoms.

The salt may be a sodium salt. In an embodiment, the dispersant comprises a sodium salt of a polyacrylic acid, a sodium salt of a polyacrylamide or a mixture of a sodium salt of an alkyl ester and 1,2-propanediol.

The dispersant can be added as such in the wet coating composition or in the form of an aqueous composition.

When the dispersant is in an aqueous solution, the amount of water can be of from about 30 to about 70 wt % water. In an embodiment, the amount of water can be of from about 30 to about 50 wt % water. In another embodiment, the aqueous composition of the dispersant comprises about 30 wt % water and about 70 wt % dispersant. In other words, the solids content of the aqueous composition of the dispersant may vary from about 30 wt % to about 70 wt %, or from about 50 wt % to 70 wt %. In an embodiment, the solids content of the aqueous composition of the dispersant is about 70 wt %.

In an embodiment, the dispersant is in an aqueous composition and comprises a mixture of a sodium salt of an alkyl ester with 1,2-propanediol. In another embodiment, the content of the sodium salt of alkyl ester in the aqueous composition of the dispersant may be from about 30 wt % to about 60 wt % and the content of 1,2-propanediol may be from about 10 wt % to about 30 wt %.

In another embodiment, the density of the aqueous solution of the dispersant is from about 0.95 g/ml to about 1.05 g/ml. The density may be about 1 g/ml. The surface tension of the aqueous composition of the dispersant may vary from about 23 mN/m to about 27 mN/m. In an embodiment, the surface tension of the aqueous composition of the dispersant is about 25 mN/m. The density and the surface tension of the aqueous solution of the dispersant can be measured for example by the pendant drop method using a Drop Shape Analyzer, e.g. a Drop Shape Analyzer DSA 100™ from the company Krüss.

The dispersant may therefore present any of the above described characteristics, or may present any combination of these properties.

According to an embodiment, the aqueous composition of the dispersant may be characterized in that:
  its solids content is about 70 wt %;
  it comprises a mixture of a sodium salt of an alkyl ester with 1,2-propanediol;
  the content of the sodium salt of alkyl ester in the aqueous composition is from about 30 wt % to about 60 wt % and the content of 1,2-propanediol is from about 10 wt % to about 30 wt %;
  its density is about 1 g/ml; and
  its surface tension is about 25 mN/m.

Wet Coating Composition and Resulting Coating

The wet coating composition comprises a combination of the oxidized paraffin/polyethylene wax emulsion with the acrylic/ethylene based copolymer wax emulsion as described above. In an embodiment, the coating composition further includes a dispersant as described above.

The oxidized paraffin/polyethylene wax emulsion can be present in the wet coating composition in at least about 60 wt % based on the total weight of the wet coating composition. In another embodiment, the wet coating composition can include at least about 80 wt % of the oxidized paraffin/polyethylene wax emulsion, or even at least about 88 wt % thereof.

The amount of aqueous ethylene/acrylic based copolymer wax emulsion in the wet coating composition is less than or equal to about 40 wt % based on the total weight of the wet coating composition. In another embodiment, this amount is less than or equal to about 20 wt % and in a specific embodiment less than or equal to about 10 wt %.

The dispersant aqueous composition can be used in an amount of less than or equal to 5 wt % of the total weight of the wet coating composition. In an embodiment, the dispersant aqueous composition is present in an amount of less than 2 wt % of the total weight of the wet coating composition.

In an embodiment, the wet coating composition comprises at least about 88 wt % of an aqueous oxidized paraffin/polyethylene wax emulsion, less than about 10 wt % of an aqueous ethylene/acrylic acid copolymer wax emulsion, and less than about 2 wt % of a dispersant aqueous composition.

In another embodiment, the wet coating composition comprises about 88.4 wt % of the aqueous oxidized paraffin/polyethylene wax emulsion, about 9.7 wt % of the aqueous ethylene/acrylic acid copolymer wax emulsion and about 1.9 wt % of the dispersant aqueous composition.

If necessary, water can also be added to the wet coating composition to further dilute the composition. Dilution may be required to reach a predetermined solids content in the wet coating composition and/or to reach the appropriate percentage of dry coating onto the paper substrate. More particularly, dilution may be required depending on the basis weight of the paper substrate to which the wet coating is applied, to reach the appropriate percentage of dry coating required to obtain the water-resistance properties which are sought. For example, the wet coating composition can be diluted in additional water to reach a weight percentage of the wet composition in additional water of about 50 to about 95 wt %. In another embodiment, the wet coating composition can be diluted to reach a weight percentage of the wet composition in additional water of about 75 to about 95 wt %.

An example of a diluted coating composition according to an embodiment comprises about 66.3 wt % of an aqueous oxidized paraffin/polyethylene wax emulsion, about 7.3 wt % of an aqueous ethylene/acrylic acid copolymer wax emulsion, about 1.4 wt % of a dispersant aqueous composition and about 25 wt % additional water.

In an embodiment, the solids content of the wet coating composition, diluted or not, may range from about 1 to about 50 wt %. In another embodiment, the solids content of the wet coating composition, diluted or not can be from about 15 wt % to about 30 wt %.

The aqueous oxidized paraffin/polyethylene wax emulsion, aqueous ethylene/acrylic acid copolymer wax emulsion and dispersant aqueous composition used in the above wet coating compositions (diluted or not) may present any one of the characteristics previously described for each of them or any combination of these characteristics.

The dry coating resulting from the wet coating composition has a surface energy which is the sum of polar and dispersive energy. In an embodiment, the surface energy of the dry coating can range from about 20 to about 60 mN/m. In another embodiment, the surface energy of the final coating can range from about 21 to about 34 mN/m. In some embodiments, the surface energy of the final coating can be about 24-25 mN/m. In an embodiment, the polar contribution can represent about 1 to 3% of the total surface energy. In another embodiment, the polar contribution can represent about 1 to 2% of the total surface energy (e.g. about 1.5-1.7%).

The wet coating composition is used for coating cellulosic fiber-based substrates and to provide water resistance to the articles obtained from such substrates. The cellulosic fiber-based substrate can be any recycled or virgin of liner, medium, chipboard, folding carton, kraftpak paper, paperboard, bag paper or any other cellulosic fiber-based substrate. The cellulosic fiber-based substrate is generally a substrate having two surfaces.

The wet coating composition can be applied to substrates with different basis weights. For example, the basis weight of the substrate can vary from about 50 g/m² to about 2000 g/m². In an embodiment, the basis weight of the substrate can vary from about 85 g/m² to about 350 g/m².

As will be explained below, the wet coating composition once applied to the substrate surface is activated to provide a substrate coated with a dry coating. The dry coating provides a barrier towards water to the article which will be made from the coated substrate. In an embodiment, the amount of dry coating in the coated substrate can be up to about 15 wt %. In another embodiment, it is up to about 10 wt %. In a further embodiment, the weight percentage of dry coating in the coated substrate is up to about 5 wt %. The weight percentage of dry coating in the coated substrate can be as little as about 2 wt %, for example when the coating composition is applied discontinuously, as explained below.

Process

An embodiment of a process for coating a paper substrate using the above described wet coating composition will be now described.

The wet coating composition can be used as is, that is as the mixture of the basic components (oxidized paraffin/polyethylene wax emulsion, ethylene/acrylic based copolymer wax emulsion and optionally the dispersant) or can be diluted before application. For example, the wet coating composition, which is an aqueous composition, can be further diluted in water.

The liquid coating composition can be applied either on one surface of the substrate or both surfaces thereof.

The liquid coating can be applied continuously or discontinuously. The term "continuously" is used herein to indicate that the liquid coating is applied in such a way that the surface of the substrate which is treated is substantially fully recovered with a layer of the coating composition. In other words, a continuous application results in substantially 100% coverage of the substrate surface with the coating composition. The term "discontinuously" is used herein to indicate that the liquid coating is applied in such a way that only sections of the substrate surface which is treated are covered with the coating composition thus leaving uncovered sections on the surface at coating application. When the coating is applied discontinuously, the sections of the surface substrate which are covered with the coating composition may be substantially regularly distributed on the substrate surface. The sections which are covered with the coating composition can be in the form of strips, discs (or bubbles), diamonds, etc. . . . . . FIG. 9 shows examples of patterns resulting from a discontinuous application of the wet coating composition on the surface of a substrate 10. FIG. 9A represents a strip pattern coating where the wet coating composition is applied as substantially evenly spaced apart strips on the substrate surface leaving uncoated strips extending therebetween. FIG. 9B represents a bubble pattern and FIG. 9C a diamond pattern where the wet coating composition is applied in the shape of nested spaced apart bubbles or diamonds on the substrate surface leaving uncoated sections extending in between. The sections 12 of the surface treated with the coating composition and the untreated sections 14 are preferably substantially regularly distributed on the substrate surface. When the wet coating composition is applied discontinuously, it may be applied over at least about 50% of the whole substrate surface. Of course, the application is performed on less than 100% of the surface. Otherwise, one would refer to a continuous application, as explained above. In some cases, the wet coating composition is applied on at least about 70% of the substrate surface, i.e. at least about 70% of the substrate surface is coated with the wet coating composition.

There are many different methods known to one skilled in the art which can be used to apply the coating onto the paper substrate. For example, and without being limited to, the liquid coating could be applied continuously to the substrate using a rod coater, a size press, a blade coater, a gravure coater or an impregnator.

The use of an impregnator or a size press would be appropriate for example to apply the coating composition continuously on both surfaces of the substrate simultaneously. Usually, the blade coater, the rod coater or the gravure coater will only coat one surface of a sheet substrate at once. However, it could be possible to adapt the blade coater and the rod coater systems for being able to apply the coating on both surfaces of the substrate in a single process. For example, a coating shower could be added to the rod coater or the blade coater and the coating composition could be applied on both sides of the substrate at the same time.

When the coating composition is applied discontinuously to form strips on the substrate surface, one can use a rod coater provided with a toothed blade installed against the applicator roll. However, other techniques could be used to form strips, such as a direct or indirect roll coater, an open-ended tube which would continuously deposit the coating directly onto the substrate, a direct or indirect gravure coater or a flexographic press.

FIG. 10 represents an example of a toothed blade that could be used for applying the coating composition in strips. FIG. 10A is a photograph of the toothed blade and FIG. 10B is a schematic representation thereof. The symbol "d" is used to represent the depth of one tooth, "w" represents the width of one tooth and "D" the distance between two adjacent teeth.

In the toothed blade shown in FIG. 10, d is equal to 0.045 inch, D is equal to 0.125 inch and w is equal to 0.2 inch (1 inch=25.4 mm). However, the size of the teeth and the distance between the teeth could be different and adapted to apply a predetermined quantity of coating composition on the substrate. It is also possible to use a toothed blade with teeth of different width and/or depth. Also the distance between the adjacent teeth can be identical throughout the blade or can vary between two adjacent ones of the teeth in the same blade.

For example, the toothed blade could be a combination of teeth with any of the following characteristics: depth of 0.030", 0.040", 0.050", 0.060" or 0.070"; width of 0.20", 0.30", 0.40", 0.50" or 0.60". Moreover, the distance between two teeth could be 0.0625", 0.125", 0.187", 0.25" or 0.375".

In an embodiment, the toothed blade includes teeth with a width of 0.20", the distance between the teeth is 0.125" and the teeth depth is 0.030", 0.045", 0.050", 0.060" or 0.070". In a particular embodiment, the toothed blade is characterized by a tooth width of 0.20", a tooth depth of 0.045" and the distance between the teeth is 0.125".

In another embodiment, one can use an interleaving scraper to stop coating near the edge of the paper to avoid coating transfer on the edge of the paper. The interleaving scraper can be positioned between the paper to coat and the applicator roll. The material used to make the scraper can be Mylar, brass, aluminum or any of type of material able to be thin enough to be inserted between the paper and the applicator roll. The width of the scraper is adapted to stop coating near the edge of the paper to avoid coating transfer on the edge of the paper. While the interleaving scraper can be made of a continuous material for a continuous application, in the case where a strip coating pattern is required, some perforations can be made onto the scraper so that the coating provided by the applicator roll will be transferred to these perforations onto the paper. An example, of interleaving scraper for an application in strips is shown in FIG. 11. In an embodiment, the scraper used for a continuous application can be about 4 inches wide. In another embodiment, the scraper used for a discontinuous application in strips, such as the one shown in FIG. 11 can be about 6¾ inches wide.

In another embodiment, a shower 16 in the form of a tube provided with several holes along its length can be used to transfer the coating (see FIG. 12A). For this type of applicator, there is no need for an applicator roll since the shower delivers directly the coating by the holes to the paper (see FIG. 12B).

To obtain other patterns, such as bubbles or diamonds, when applying the wet coating composition, one could use embossed rollers, a rotating shower, a printing press or an engraved roller system.

The quantity of wet coating composition to be applied will depend on different parameters such as for example the nature of the substrate, the basis weight of the substrate, the fact that the composition is applied continuously or discontinuously, the fact that it is applied on one side or both sides of the substrate, the water resistance properties which are sought etc., and one skilled in the art will be able to determine the quantity of coating composition required for each application. The quantity of wet coating composition to be applied continuously is determined such that it should substantially cover the whole surface of the substrate on at least one face thereof. For a discontinuous application, the quantity of wet coating composition is determined such that the composition should cover at least about 50% of the whole substrate surface on at least one face thereof.

Once applied, the wet coating composition is absorbed by the substrate at the surface thereof. Then, the resulting coating is "activated" through heating of the coated substrate. Any known type of heating unit can be used for activating the coating. For example, the coating can be activated in a gas dryer. Alternatively, one can activate the coating in a corrugator.

The "activation" step can be defined as comprising two sequential phases. In the first phase, the coating composition which has been applied to the substrate is dried through heating to remove water. Then, in the second phase, the substrate is further heated to activate the "dried" coating. Because of its polymeric composition, the dried coating which has a relatively low surface energy becomes liquid when further heated and then, by a simple surface energy mechanism, tends to move towards a high surface energy portion such as the core of the substrate and/or the sections of the substrate surface which are not covered in the case where the coating composition is applied discontinuously, to reach the equilibrium. Thus, in the second phase of the activation step, the polymer particles present in the "dried" coating are allowed to migrate upon heating and the coating can reach the core of the substrate and the uncovered sections of the substrate surface when application is discontinuous, thereby forming a water-resistant barrier on the whole surface of the substrate and extending from the surface of the substrate to the core thereof. When the coating composition is applied on the two sides of the sheet substrate and activation takes place, the water-resistant barrier which forms extends substantially from one side of the sheet substrate to the other side thereof, resulting in a substantially complete distribution across the thickness of the sheet. In other words, one can say that the substrate is "impregnated" with the coating.

Activation can thus be performed through a single step in one heating unit, such as for example in a dryer. When carrying out the activation in this way, the substrate is maintained in the heater for a period of time that is long enough for allowing the coating to migrate towards the core of the substrate and the uncovered sections of the substrate surface if application was discontinuous. The time required for activation will depend on the nature of the substrate, its basis weight, the quantity of coating applied to the substrate, and the temperature. One skilled in the art will be able to choose these parameters for obtaining a final coating with the required water resistance properties. In an embodiment, the temperature for activating the coating is at least about 65° C. In another embodiment, the activation temperature ranges from about 70° C. to about 100° C.

Alternatively, activation of the coating can be performed in two different heating units. In this case, the first phase of the activation step, namely the drying of the coating composition, is carried out in the first heating unit, such as and without being limitative a gas dryer or an infrared dryer. The second phase of the activation step, during which the coating is further heated to allow migration thereof towards the core of the substrate, is then carried out in the second heating unit, for example a gas dryer or an infrared dryer.

The two heating units used for activating the coating as explained above can be present in the same process unit. However, it is also possible to apply the coating composition and to carry out the first phase of the activation step (drying of the coating) in one process unit, and then, to perform the second phase of the activation treatment (reaching the temperature to allow migration of the coating towards the core of the substrate) in another unit. For example, the coating can be applied continuously or discontinuously and dried (first phase of the activation) in one process unit, and then the coated substrate can be transported in another process unit wherein the second phase of the activation can take place. For example, the second phase of the activation step can be carried out during a corrugation process. In this case, the heat provided by the hot plate section of the corrugator induces migration of the coating towards the core of the substrate while it is corrugated.

The first phase of the activation step, also called drying step, can be performed at a drying temperature selected to obtain a web temperature, i.e. the temperature of the coated paper substrate at the exit of the first heating unit (e.g. dryer), comprised between about 40° C. and about 95° C. In an embodiment, the drying temperature is selected to obtain a web temperature of about 70° C.

The second phase of the activation step may be carried out at a temperature of at least about 65° C. In an embodiment, this second phase activation temperature can be above the web temperature of the drying step. For example, it can range from about 70° C. to about 100° C. However, it is also possible to activate the dried coating at the same temperature than the temperature of the drying step. In this case, the residence time of the substrate in the activation unit will be longer compared to the residence time if the activation temperature is above the temperature of the drying step.

As mentioned above, the wet coating composition can be applied either on one surface of the substrate or on both surfaces thereof. The wet coating composition can also be applied continuously or discontinuously. Hence, the wet coating composition can be applied continuously or discontinuously on both surfaces of the substrate, or in some cases, it can be applied continuously on one surface of the substrate and discontinuously on the other surface. Any combination can be foreseen.

When the wet coating composition is applied continuously on both surfaces at the same time, the activation step will allow migration of the coating towards the core of the substrate from both surfaces also at the same time. However, it could also be possible to first apply the coating composition on just a first surface of the substrate (continuously or discontinuously) and then activate the coating which will migrate towards the core of the substrate and towards the uncovered sections of the substrate surface on the first surface if application was discontinuous, and in a second time apply the wet coating composition on the second surface of the substrate (continuously or discontinuously) and activate the coating to allow migration towards the substrate's core in the direction of the coated first surface and towards the uncovered sections of the substrate surface on the second surface if application was discontinuous. In another alternative embodiment, the coating composition is applied continuously on just a first surface of the substrate and is activated to allow migration of the coating throughout the thickness of the substrate to reach the opposite second surface thereof. It can also be possible to apply the coating composition discontinuously on just a first surface of the substrate. Then, activation allows migration of the coating towards the uncovered sections of the substrate surface on the first surface and throughout the thickness of the substrate to reach the opposite second surface thereof. In this latter case of application on just one surface, the period of time during which the substrate is heated for activating will be adapted to allow substantial homogenization of the coating throughout the substrate's thickness.

The coating process can be applied to any type of cellulosic fibers substrates, such as recycled or virgin liner, medium, chipboard, folding carton, kraftpak paper, bag paper or any other cellulosic fibers substrate.

In order to reach the desired dry coating weight in the treated substrate at the end of the process, it is possible to apply the same quantity of wet coating composition on both surfaces of the substrate or to apply a smaller quantity of the composition on one surface and a larger quantity thereof on the other surface. Since there is migration of the coating towards the core of the substrate during the activation step, the resulting coating can be homogeneously distributed throughout the thickness of the substrate, independently of the relative quantity of wet coating composition applied on both surfaces thereof. Moreover, if required, the period of time during which the substrate is heated during the activation step can be adapted to improve distribution of the coating throughout the thickness of the substrate at the end of the process.

Moreover, the amount of wet coating composition to be applied will depend on the nature of the substrate and also on the intended application thereof. For example, a larger amount of wet coating composition will be applied if the article to be made using the coated substrate needs a high water-resistance.

In an embodiment, the weight percentage of dry coating in the treated substrate at the end of the process, is up to about 15 wt %. In another embodiment, it is up to about 10 wt %. In a further embodiment, the weight percentage of dry coating in the treated substrate is up to about 5 wt %, and it can be about 2 wt %.

Due to its water repellant properties, the coating, which has reached the core of the substrate and extends from one surface to the other surface thereof, provides an increased protection towards water even if the edge of the treated substrate is exposed to water.

In an embodiment, the treated substrate shows an edge wicking equal to or less than about 2 mm after 72 hours. In another embodiment, the treated substrate shows substantially no edge wicking.

In another embodiment, the treated substrate shows a water absorptiveness (Cobb test 30 min) equal to or less than about 70 g/m$^2$.

Hence, the treated substrate shows limited or substantially no edge wicking and is useful for any application wherein water is present. Its water repellent properties are comparable to the one of a more traditional wax coating but thanks to the chemicals therein, it can be recycled and repulped, which is not typically possible for wax coatings.

Hence, the paper-based articles, such as corrugated boxes, made from a coated paper substrate resulting from the process are recyclable and mostly repulpable. They are useful for stocking and/or transporting any dry or fatty food products such as for example meat, poultry, fruits or vegetables. They can be refrigerated while retaining their integrity.

Moreover, the paper articles coated with the coating composition are gluable using standard adhesive (starch). Gluing can be performed on a corrugator to glue medium onto liners. When the coated paper article is a coated medium, it can be easily fluted without delamination or sticking on a corrugator wheel without any impact on the corrugator speed which can therefore run as for an untreated medium.

The following examples are provided to illustrate some properties and advantages of the coating.

EXAMPLES

The following methods were used to determine the properties of the coated samples.

Water absorptiveness (also referred to as water holdout) was measured using the TAPPI Standard Test Method No. T 441.

Water repellency was determined visually by pouring a droplet of water onto the coated substrate and checking the behavior of the droplet once on the surface of the coated substrate. If the droplet remains intact or substantially intact on the substrate surface, i.e. it beads up on the substrate surface, the symbol "+++" was used to qualify the water repellency. If the droplet does not bead up, the symbol "−" was used to qualify the water repellency. The symbol "+" was used to identify a situation where the droplet slightly beads up on the substrate's surface.

Edge wicking was measured as follows. Strips of 6 inches MD (Machine Direction)×2 inches CD (Cross Direction) were cut. Then, two inches wide adhesive tape (3M Scotch® Brand #850) was applied on both sides of the strips, the strips were cut again in width (1.5 inches in CD) and they were pressed using a 10 kg metal roller used for Cobb tests (one return). The strips were then inserted in a beaker full of water at about 23° C. leaving 1-1½ inch of the strips outside water. After 24 hours, the strips were sponged up and the water penetration measured with a ruler in CD.

Surface energy of the coated substrates was measured by the sessile drop technique using the Owens-Wendt-Rabel-Kaelble method on a Drop Shape Analyzer DSA100™ from the company Krüss. The liquid probes were ionized water, benzyl alcohol and ethylene glycol.

Strength loss/strength retention/flat crush was determined using the TAPPI 825 om-09 test method.

Fluting forming aptitude was determined using the TAPPI 809 om-09 test method.

Flutes gluability was determined using the TAPPI 821 om-12 test method (pin adhesion test).

Example 1

A 33 lb/1000 ft$^2$ (161 g/m$^2$) medium was treated with a wet coating composition according to an embodiment, referred to as "Coating Example" hereinafter. The wet coating composition of the "Coating Example" included:
 88.4 wt % of an aqueous oxidized paraffin/polyethylene wax emulsion having the following characteristics:
  the oxidized paraffin/polyethylene wax has a surface energy of 16-17 mN/m;
  it comprises a mixture of C10-C35 paraffins;
  weight percentage of paraffins is 59 wt % based on the total weight of solids of the aqueous oxidized paraffin/polyethylene wax emulsion;
  solids content of 22 wt %;
  dried emulsion has an onset melting temperature of 23° C. and an end melting temperature of 56° C. as measured by DSC;
  a viscosity at 24° C. and 100 rpm (spindle no. 1) of 16.1 cP; and
  particle size distribution characterized by a Surface Weighted Mean D[3,2] of 0.467 μm and a d(0.5) of 0.555 μm;
 9.7 wt % of an aqueous ethylene/acrylic acid copolymer wax emulsion having the following characteristics:
  solids content of 32 wt %;
  dried emulsion has an onset melting temperature of 62° C. and an end melting temperature of 93° C. as measured by DSC (see FIG. 3);
  viscosity at 24° C. and 100 rpm (spindle no. 4) of 844 cP; and
  particle size distribution characterized by a Surface Weighted Mean D[3,2] of about 0.112 μm and a d(0.5) of about 0.120 μm;
 and
 1.9 wt % of a dispersant aqueous composition having the following characteristics:
  solids content of about 70 wt %;
  it comprises a mixture of a sodium salt of an alkyl ester with 1,2-propanediol;
  content of the sodium salt of alkyl ester in the aqueous composition is from about 30 wt % to about 60 wt % and the content of 1,2-propanediol is from about 10 wt % to about 30 wt %;
  density of 0.996 g/ml; and
  surface tension of 25 mN/m.

The wet coating composition of the Coating Example was applied on both surfaces of the medium using a rod coater equipped with a coating shower. The wet coating composition was dried in a first dryer at a web temperature of 70° C. and migration of the coating was performed in a second dryer at a web temperature of 82° C. The resulting treated medium included about 5 wt % dry coating.

The following tests were performed to assess water resistance of the treated medium:
 measurement of water absorptiveness of the medium treated with the Coating Example and comparison with an untreated medium; and
 evaluation of the strength retention after immersion of a combined board made with the medium treated with the Coating Example and comparison to a combined board treated with a wax free water-based acrylic coating composition commercialized under the name Spectra-Kote™ 763BAF referred to as "Comparative Coating Example 1". In Comparative Coating Example 1, Spectra-Kote™ 763BAF was applied on both surfaces of a 33 lb/1000 ft² (161 g/m²) liner using a size press. The coating was then allowed to dry at 100° C. The resulting treated liner included about 5 wt % dry coating. It is worth noting that in "Comparative Coating Example 1", the coating composition did not migrate through the substrate's thickness.

The results are provided in Tables 1 and 2.

TABLE 1

Properties of medium treated with "Coating Example" and comparison with untreated medium

| Properties and units Fibrous substrate | | Medium treated with Coating Example Medium, 33 lb/1000 ft² | Untreated medium |
|---|---|---|---|
| Water absorptiveness (Cobb test) (30 min) | $g_{water}/m^2$ | 70 | 238 |
| Edge wicking test (72 h) | mm | 2 | Saturated |
| Surface energy* | mN/m | 34 | >60 |

*Surface energy determined using an ACCU DYNE TEST ™ Marker Pen

These results showed that the treatment with the Coating Example was effective as it decreased water absorptiveness (30 minutes Cobb) of a 33 lb/1000 ft² medium from 238 to 70 g water/m². Water penetration through the edge of the medium treated with Coating Example during edge wicking test was only 2 mm after 72 hours of immersion in water.

TABLE 2

Properties of corrugated combined boards

| Properties and units | | Coating Example | Comparative Coating Example 1 |
|---|---|---|---|
| Basis weight (as is) | g/m² | 777.8 | 792.1 |
| Flat Crush   as is | psi | 66.4 ± 2.3 | 43.7 ± 1.8 |
|              wet |  | 35.2 ± 7.0 | 21.6 ± 4.5 |
| Strength loss | % | 47 | 51 |

These results showed that the corrugated combined board treated with the Coating Example lost 47% flat crush strength after 5 minutes of immersion in water while the one treated with Spectra-Kote™ 763BAF in Comparative Coating Example 1, lost 51%. Those results showed that Coating Example provides a strength retention that is at least as efficient as and even slightly better than Spectra-Kote™ 763BAF.

Example 2

Tests were performed to confirm that a medium coated with the Coating Example of Example 1 can easily be corrugated (shaped in flutes) and glued to single facer and double backer. These tests also compared runnability and gluability of the medium treated with Coating Example with the same medium (33 lb/1000 ft²) treated with Spectra-Kote™ 763BAF (Comparative Coating Example 2). The coating with Spectra-Kote™ 763BAF in Comparative Coating Example 2 was carried out in the same way than for Coating Example (see Example 1).

The single facer (inside liner) used with the medium treated with Coating Example or with Spectra-Kote™ 763BAF was Cascades Sonoco SurfSHIELD™ Fruits & Vegetables Plus (30 minutes Cobb<10 g/m²).

The double backer (outside liner) used with the medium treated with Coating Example or with Spectra-Kote™ 763BAF was Cascades Sonoco SurfSHIELD™ Fruits & Vegetables SuperCobb (30 minutes Cobb<10 g/m²).

Both the medium treated with Coating Example and Spectra-Kote™ 763BAF were coated on both surfaces.

The corrugator speed was 300 ft/min (about 90 m/min). The adhesive was a standard starch adhesive cooked at 25% w/w. The hot plates were heated at 375° F. (about 190° C.). The web temperature of the paper was 175° F. (about 80° C.).

Water holdout (water absorptiveness) was measured using Cobb test. The results are as follows:
  30 minutes Cobb of 70 g/m² for the medium treated with Coating Example;
  30 minutes Cobb of 112 g/m² for the medium treated with Spectra-Kote™ 763BAF (Comparative Coating Example 2).

The medium treated with Coating Example was well glued to both single facer and double backer. Also, its activation was complete and the product was very water repulsive.

Spectra-Kote™ 763BAF treated medium of Comparative Coating Example 2 ran well and from a runnability perspective, the medium treated with Coating Example ran and glued as good as the one of Comparative Coating Example 2 treated with Spectra-Kote™ 763BAF. No difference was noticed. When water was poured on the medium treated with Spectra-Kote™ 763BAF, almost no repellence was observed while the medium treated with Coating Example provided a high repellence to water.

Hence, these results confirmed that runnability, fluting and gluing was reached with success using a medium treated with Coating Example.

Example 3

The following Table 3 summarizes the properties and advantages of the medium treated with Coating Example, and also provides a comparison with the liner treated with Spectra-Kote™ 763BAF of Comparative Coating Example 1 (see Example 1) and the medium treated with Spectra-Kote™ 763BAF of Comparative Coating Example 2 (see Example 2). It should be noted that the liner treated with Spectra-Kote™ 763BAF was used as a medium.

TABLE 3

Comparison of the properties of "Coating Example", "Comparative Coating Example 1" and "Comparative Coating Example 2"

| Properties | Coating Example | Comparative Coating Example 1 | Comparative Coating Example 2 |
|---|---|---|---|
| Water repellency | +++ | − | + |
| Water holdout (30 min Cobb) | 70 g/m² | 80-110 g/m² | >120 g/m² |
| Edge wicking | 0.6 mm in 24 h | <5 mm in 24 h | >25 mm in 24 h |
| Type of substrate | Medium | Liner | Medium |
| Fluting forming aptitude | +++ | + (delamination possible) | +++ |
| Flutes gluability (w/WRA)* | >60 kg/m | >60 kg/m | >60 kg/m |
| Strength retention (flat crush after water immersion) | 53% | 49% | ND |

TABLE 3-continued

Comparison of the properties of "Coating Example", "Comparative Coating Example 1" and "Comparative Coating Example 2"

| Properties | Coating Example | Comparative Coating Example 1 | Comparative Coating Example 2 |
|---|---|---|---|
| Finish appearance | Dark (similar to wax) | None | Slight/dark |

*The target for flutes gluability was 60 kg/m minimum

Example 4

In this example, a wet coating composition according to an embodiment was applied discontinuously on a 33 lb/1000 ft² (161 g/m²) medium. The wet coating composition was the same as the one of the "Coating Example" of Example 1. The wet coating composition was applied discontinuously on both surfaces of the medium using a toothed blade attached to the coating roll of a rod coater. The coating was dried in a first dryer at a web temperature of 70° C. and migration of the coating was performed in a second dryer at a web temperature of 82° C.

The toothed blade had the following characteristics:
teeth width: 0.2 inch (0.51 cm)
teeth depth: 0.045 inch (0.11 cm)
distance between two teeth: 0.125 inch (0.32 cm).

Three different samples were prepared as detailed below by changing the quantity of the coating composition applied onto the medium surface for each sample.

"Reference": application was performed so as to obtain continuous strips of the coating composition on both surfaces of the medium; the strips were substantially regularly spaced with substantially regularly spaced uncoated strips extending in between on the medium surface (see FIG. 13A). The surface coverage with the coating composition was approximately 70% on each surface of the medium.

"Empty": application was performed so as to obtain discontinuous strips of the coating composition on both surfaces of the medium. Small sections of the recto surface of the medium were coated with the composition while leaving wide uncoated sections (see FIG. 14A). The surface coverage with the coating composition was approximately 30% on the recto surface of the medium. The verso surface was coated in the same way as for the "Reference" sample, i.e. with strips of the coating composition substantially regularly spaced and a verso surface coverage of approximately 70%.

"Full": application was performed so as to obtain wide strips of the coating composition on both surfaces of the medium; application resulting in superimposition of some of the strips of coating composition generating wide sections of the medium surface being coated with the composition and small uncoated sections on the medium surface (see FIG. 15A). The surface coverage with the coating composition was approximately 90% on each surface of the medium.

As shown in FIGS. 13B, 14B and 15B, the whole surface of the medium was fully covered after activation for the three samples. This shows the great capacity of the coating to move towards the uncoated sections on the surface of the medium thereby forming a substantially uniform coating thereon. Moreover, the coating composition is allowed to move towards the core of the substrate upon activation, thereby providing good barrier properties as also shown in Tables 4 and 5 below.

Example 5

The water resistance and edge wicking properties of the samples referred to as "Reference", "Empty" and "Full" in Example 4 was measured. Both surfaces of the samples were tested. The results are provided in Tables 4 and 5 below.

TABLE 4

30-minute Cobb

| Sample ID | 30-minute Cobb Average ($g_{water}/m^2$) | Standard Deviation |
|---|---|---|
| Reference-Recto | 54 | 1 |
| Reference-Verso | 56 | 1 |
| Empty-Recto | 55 | 1 |
| Empty-Verso* | 58 | 3 |
| Full-Recto | 53 | 1 |
| Full-Verso | 54 | 1 |

*Verso of "Empty" sample was coated as the "Reference" sample

TABLE 5

24-hour Edge Wick test

| Sample ID | Water penetration (mm) |
|---|---|
| Reference-Recto 1 | 0 |
| Reference-Recto 2 | 1 |
| Reference-Recto 3 | 2 |
| Reference-Recto 4 | 0 |
| Reference-Verso 1 | 0 |
| Reference-Verso 2 | 0 |
| Reference-Verso 3 | 0 |
| Reference-Verso 4 | 1 |
| Empty-Recto 1 | 0 |
| Empty-Recto 2 | 2 |
| Empty-Recto 3 | 1 |
| Empty-Recto 4 | 0 |
| Empty-Verso* 1 | 2 |
| Empty-Verso* 2 | 0 |
| Empty-Verso* 3 | 0 |
| Empty-Verso* 4 | 1 |
| Full-Recto 1 | 0 |
| Full-Recto 2 | 0 |
| Full-Recto 3 | 0 |
| Full-Recto 4 | 0 |
| Full-Verso 1 | 0 |
| Full-Verso 2 | 0 |
| Full-Verso 3 | 0 |
| Full-Verso 4 | 0 |

*Verso of "Empty" sample was coated as the "Reference" sample

The results provided in Tables 4 and 5 show that thanks to the coating migration through activation, the coated substrate presents good water resistance and edge wicking properties.

The above-described embodiments and examples are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The scope of the invention is therefore intended to be limited solely by the scope of the appended claims.

The invention claimed is:

1. A wet coating composition for coating a cellulosic fiber-based substrate, comprising:
a first aqueous emulsion of a wax comprising an oxidized paraffin and an oxidized polyethylene; and a second aqueous emulsion of at least one copolymer wax comprising ethylene and acrylic monomers, wherein the at least one copolymer wax is selected from the group consisting of an ethylene/acrylic acid copolymer wax, an ethylene/acrylic amide copolymer wax, an ethylene/acrylic acid/acrylic amide copolymer wax, and a mixture thereof;

wherein the wax comprising an oxidized paraffin and an oxidized polyethylene has a surface energy of less than or equal to 25 mN/m, being substantially dispersive energy; and wherein the wet coating composition, when dried forms a coating having a surface energy ranging from 20 to 60 mN/m, being the sum of dispersive and polar energies.

2. The wet coating composition of claim 1, wherein the surface energy of the wax comprising an oxidized paraffin and an oxidized polyethylene ranges from about 16 to about 21 mN/m.

3. The wet coating composition of claim 1, wherein the surface energy of the coating ranges from about 21 to about 34 mN/m.

4. The wet coating composition of claim 1, further comprising a dispersant in the form of an aqueous composition, wherein the dispersant comprises a salt of a polyacrylic acid, a salt of a polyacrylamide, a salt of a carboxylic acid, a mixture of a salt of an alkyl ester and an alkyl diol, or any mixture thereof.

5. The wet coating composition of claim 1, wherein the first aqueous emulsion has a solids content varying from about 5 to about 25 wt % and/or the second aqueous emulsion has a solids content varying from about 1 to about 35 wt %.

6. The wet coating composition of claim 1, wherein the first aqueous emulsion is present in at least about 60 wt % of the total weight of the wet coating composition and the second aqueous emulsion is present in less than or equal to about 40 wt % of the total weight of the wet coating composition.

7. The wet coating composition of claim 1, wherein the first aqueous emulsion is present in at least about 80 wt % of the total weight of the wet coating composition and the second aqueous emulsion is present in less than or equal to about 20 wt % of the total weight of the wet coating composition.

8. The wet coating composition of claim 1, wherein the first aqueous emulsion comprises a mixture of C10-C35 paraffins and has a weight percentage of paraffin of about 45 to about 60 wt % based on the total weight of solids of the first emulsion.

9. The wet coating composition of claim 1, wherein the first aqueous emulsion is characterized by an onset melting temperature measured by differential scanning calorimetry (DSC) after drying thereof at room temperature, varying from about 20° C. to about 40° C. and by an end melting temperature measured by DSC after drying thereof at room temperature, varying from about 45° C. to about 90° C.

10. The wet coating composition of claim 1, wherein the first aqueous emulsion has a particle size distribution characterized by a Surface Weighted Mean D[3,2] ranging from about 0.30 μm to about 0.50 μm and a particle size distribution characterized by a d(0.5) ranging from about 0.30 μm to about 0.60 μm.

11. The wet coating composition of claim 1, wherein the at least one copolymer wax comprising ethylene and acrylic monomers comprises the ethylene/acrylic acid copolymer wax.

12. The wet coating composition of claim 1, wherein the second aqueous emulsion is characterized by an onset melting temperature measured by DSC after drying thereof at room temperature, varying from about 60° C. to about 65° C. and by an end melting temperature measured by DSC after drying thereof at room temperature, varying from about 90° C. to about 95° C.

13. The wet coating composition of claim 1, wherein the second aqueous emulsion has a particle size distribution characterized by a Surface Weighted Mean D[3,2] ranging from about 0.05 μm to about 0.2 μm.

14. A cellulosic fiber-based substrate having two surfaces, wherein the cellulosic fiber-based substrate is coated on at least one of the two surfaces with a coating obtained by applying the wet coating composition of claim 1, and wherein the coating extends from the at least one surface towards a core of the cellulosic fiber-based substrate.

15. The cellulosic fiber-based substrate of claim 14, wherein the coating represents about 15 wt % of the weight of the cellulosic fiber-based substrate.

16. The cellulosic fiber-based substrate of claim 14, wherein the coating represents about 10 wt % of the weight of the cellulosic fiber-based substrate.

17. The cellulosic fiber-based substrate of claim 14, wherein the coating represents about 5 wt % of the weight of the cellulosic fiber-based substrate.

18. The cellulosic fiber-based substrate of claim 14, wherein the coating represents about 2 wt % of the weight of the cellulosic fiber-based substrate.

19. The cellulosic fiber-based substrate of claim 14, wherein the cellulosic fiber-based substrate is a recycled or virgin liner, medium, chipboard, folding carton, kraftpak paper, paperboard, or bag paper.

20. A box comprising the cellulosic fiber-based substrate of claim 14, wherein the cellulosic fiber-based substrate is a corrugated medium.

* * * * *